US010878734B1

(12) United States Patent
Watsuda et al.

(10) Patent No.: US 10,878,734 B1
(45) Date of Patent: Dec. 29, 2020

(54) DRIVING CIRCUIT, TILED ELECTRONIC DEVICE, AND TEST METHOD

(71) Applicant: InnoLux Corporation, Miao-Li County (TW)

(72) Inventors: Hirofumi Watsuda, Miao-Li County (TW); Kazuyuki Hashimoto, Miao-Li County (TW); Jui-Feng Ko, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/165,091

(22) Filed: Oct. 19, 2018

Related U.S. Application Data

(63) Continuation of application No. 16/161,359, filed on Oct. 16, 2018, now abandoned.

(60) Provisional application No. 62/598,021, filed on Dec. 13, 2017.

(51) Int. Cl.

*G09G 5/10* (2006.01)
*G06F 3/038* (2013.01)
*G09G 5/00* (2006.01)
*G09G 3/00* (2006.01)
*G09G 3/32* (2016.01)

(52) U.S. Cl.

CPC ............... *G09G 3/006* (2013.01); *G09G 3/32* (2013.01); *G09G 2300/026* (2013.01); *G09G 2310/0297* (2013.01)

(58) Field of Classification Search

CPC ...................................................... G09G 3/006
See application file for complete search history.

(56) References Cited

U.S. PATENT DOCUMENTS

| | | | | |
|---|---|---|---|---|
| 2005/0162076 | A1* | 7/2005 | Kato | H01L 27/3288 313/504 |
| 2010/0253706 | A1* | 10/2010 | Shirouzu | G09G 3/2092 345/690 |
| 2011/0227505 | A1* | 9/2011 | Park | H05B 33/0896 315/297 |
| 2016/0042690 | A1* | 2/2016 | Chang | G09G 3/3258 345/212 |
| 2016/0189621 | A1* | 6/2016 | Kim | G09G 3/3258 345/215 |
| 2016/0335955 | A1* | 11/2016 | Cho | G09G 3/3233 |
| 2018/0033373 | A1* | 2/2018 | Hong | G09G 3/3233 |
| 2018/0061295 | A1 | 3/2018 | Hong | |

* cited by examiner

*Primary Examiner* — Nan-Ying Yang
(74) *Attorney, Agent, or Firm* — McClure, Qualey & Rodack, LLP

(57) ABSTRACT

A driving circuit includes a driving unit, a light-emitting element, and a detection unit. The driving unit has a first terminal coupled to a first voltage source, a second terminal coupled to a data line to receive a plurality of display data, and a third terminal coupled to a first node. The driving unit provides a driving signal to the first node according to the plurality of display data. The light-emitting element has a first terminal coupled to the first node and a second terminal coupled to a second voltage source. The detection unit is coupled to the first node and a detection node. In a test mode, when the driving unit provides the driving signal, the detection unit detects a potential of the first node to generate a detection signal which is used to indicate a state of the light-emitting element or the detection unit.

16 Claims, 15 Drawing Sheets

DRIVING CIRCUIT, TILED ELECTRONIC DEVICE, AND TEST METHOD

CROSS REFERENCE TO RELATED APPLICATIONS

This application is a Continuation of pending U.S. application Ser. No. 16/161,359, filed on Oct. 16, 2018, which claims the benefit of U.S. Provisional Application No. 62/598,021, filed on Dec. 13, 2017, the contents of which are incorporated herein by reference.

BACKGROUND

Field of the Invention

The disclosure relates to a driving circuit, and, more particularly, to a driving circuit for light-emitting diodes.

Description of the Related Art

In recent years, light-emitting diodes (LEDs) have been applied in backlight modules and display panels. In the packaging process for active matrix display panels, a large number of light-emitting diodes are connected to the display panel. The connection and assembly of the light-emitting diodes is one of the key technologies used in the displays. Therefore, how to detect whether a large number of light-emitting diodes are properly connected to the display panel has become an important research topic.

BRIEF SUMMARY

The present disclosure provides a driving circuit and a display panel that can determine the states of light-emitting elements.

An embodiment of a driving circuit is provided. The driving circuit is configured to drive a light-emitting element. The driving circuit comprises a driving unit, the light-emitting element, and a detection unit. The driving unit has a first terminal coupled to a first voltage source, a second terminal coupled to a data line to receive plurality of display data, and a third terminal coupled to a first node. The driving unit provides a driving signal to the first node according to the plurality of display data. The light-emitting element has a first terminal coupled to the first node and a second terminal coupled to a second voltage source. The detection unit is coupled to the first node and a detection node. In a test mode, when the driving unit provides the driving signal, the detection unit detects a potential of the first node to generate a detection signal which is used to indicate a state of the light-emitting element or the detection unit.

An embodiment of a tiled electronic device is provided. The tiled electronic device comprises a plurality of display panels, wherein at least one of the plurality of display panels comprises a plurality of data lines, a plurality of driving circuit, and a readout circuit. The driving circuits are electrically connected to the data lines. Each driving circuit is configured to drive a light-emitting diode and comprises a driving unit, the light-emitting element, and a detection unit. The driving unit has a first terminal coupled to a first voltage source, a second terminal coupled to one of the data lines to receive a plurality of display data, and a third terminal coupled to a first node. The driving unit provides a driving signal to the first node according to the plurality of display data. The light-emitting element has a first terminal coupled to the first node and a second terminal coupled to a second voltage source. The detection unit is coupled to the first node and a detection node. In a test mode, when the driving unit provides the driving signal, the detection unit generates a detection signal to indicate a state of the light-emitting element or the detection unit. The readout circuit comprises a multiplexer. The multiplexer comprises a plurality of input terminals IT and an output terminal OT. The input terminals of the multiplexer are coupled to the detection nodes of the driving circuits to receive the detection signals sequentially and outputs the detection signals to the output terminal OT of the multiplexer.

An embodiment of a test method for a display panel is provided. The display panel comprises a driving unit configured to drive a light-emitting element and a detection unit. The light-emitting element is coupled to the driving unit at a first node. The detection unit is coupled to the first node and a detection node. The test method comprises the steps of providing a plurality of display data; providing a driving signal to the first node according to the plurality of display data; detecting a potential of the first node; and determining whether the light-emitting element is in a failed state or the driving circuit needs to be compensated according to a potential of the detection signal.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1B:
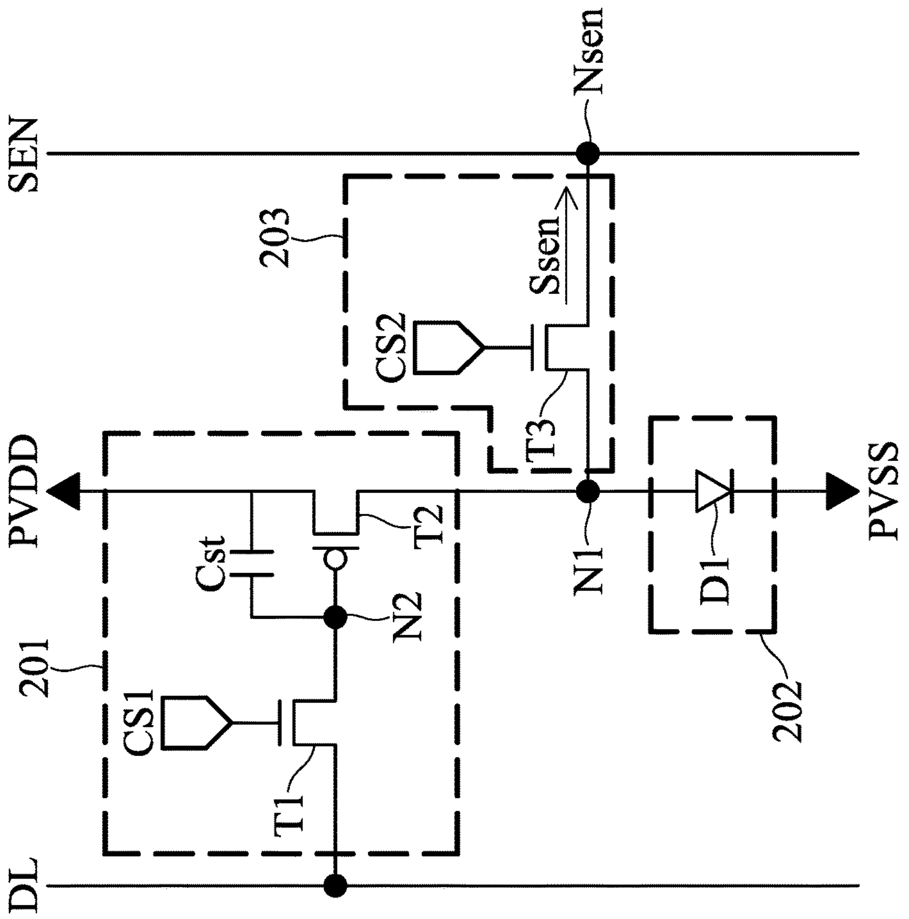
FIG. 1B is a circuit diagram of a driving circuit according to the first embodiment of the present disclosure.

The following description in some embodiments is to carry out the invention. This description is made for the purpose of illustrating the general principles of the invention and should not be taken in a limiting sense. The scope of the invention is determined by reference to the appended claims.

It should be understood that the following disclosure provides one or more embodiments or examples to implement various features of the invention. The elements and arrangements of the specific examples disclosed below are intended to simplify the invention and are not intended to be limited to the examples. In addition, the features in the drawings are not drawn to a scale and are for illustrative purposes only.

The terms "about" and "substantially" typically mean+/−20% of the stated value of the present disclosure, more typically +/−10% of the stated value and even more typically +/−5% of the stated value. The stated value is an approximate value. When there is no specific description, the stated value includes the meaning of "about" or "substantially".

The orders such as "first", "second", and so on, in the specification and the claims are only used to distinguish the elements with the same name. They do not have their own specific meanings, do not necessarily mean that there is another element existing in addition to one element, and do not mean that there is a priority between one and another elements, or one and another steps.

Figure 1A:
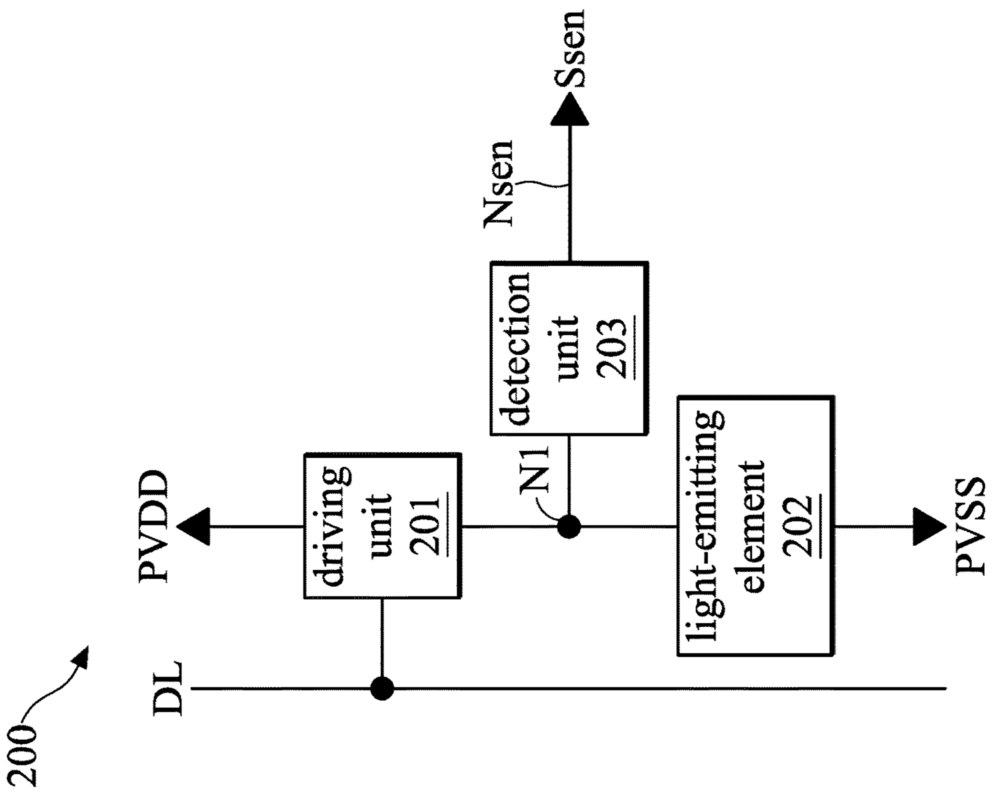
FIG. 1A is a schematic view showing a driving circuit according to a first embodiment the present disclosure.

FIG. 1A is a schematic view showing a driving circuit 200 according to a first embodiment of the present disclosure. The driving circuit 200 may operate in a plurality of operation modes, including a test mode and a display mode. In FIG. 1A, the driving circuit 200 is configured to drive a light-emitting element 202. The driving circuit 200 comprises a driving unit 201, a detection unit 203, a first voltage source, a second voltage source, and a data line (DL). In the embodiment, the first voltage source is implemented as a high voltage source PVDD, and the second voltage source is implemented as a low voltage source PVSS. In addition, a control signal of the driving circuit 200 and a plurality of display data of a data line (DL) are provided by a timing controller and a data driver (not shown) for driving the light-emitting element 202 to emit light with the brightness to be displayed. The driving unit 201 may comprise a transistor having a switching characteristic. In other embodiment, the transistor may be an amorphous thin-film transistor, a low-temperature polysilicon thin-film transistor, a metal-oxide thin-film transistor, or a combination thereof, however the disclosure is not limited thereto. The driving unit 201 at least has a first terminal, a second terminal, and a third terminal. The first terminal of the driving unit 201 is coupled to the high voltage source PVDD, and the high voltage source PVDD is coupled to a high voltage potential (VDD). The second terminal of the driving unit 201 is coupled to a data line (DL) to receive a plurality of display data represented by a plurality of voltages. The third terminal of the driving unit 201 is coupled to a first node (represented by N1). The driving unit 201 provides a conduction path between the high voltage source PVDD and the first node N1 according to the plurality of display data to provide a driving signal to the first node N1.

The light-emitting element 202 may be an organic light-emitting diode (OLED), a quantum-dot LED (QLED), a micro light-emitting diode (micro LED), or a sub-millimeter light-emitting diode (mini LED), however the disclosure is not limited thereto. The light-emitting element 202 has a first terminal coupled to the first node N1 and a second terminal coupled to the low voltage source PVSS. The low voltage source PVSS is coupled to the low voltage potential (VSS). The light-emitting element 202 can be connected to the circuitry finally after the driving circuit 200 is configured completely.

The detection unit 203 is coupled to the first node N1 and a detection node Nsen (also shown in FIG. 1B). The detection unit 203 generates a detection signal Ssen at the detection node Nsen. According to an embodiment of the disclosure, when the driving circuit 201 provides the driving signal in the test mode, the detection signal Ssen may indicate whether the driving unit 201, the light-emitting element 202 or the detection unit 203 is in a failed state. In detail, during a first test period in the test mode, the driving unit 201 provides the driving signal, and when the potential of the detection signal Ssen is not as designed, it is determined that at least one of the driving unit 201 or the detection unit 203 is in a failed state. The light-emitting unit 202 usually doesn't electrically connect to the node N1 during the first test period, which means that the light-emitting unit 202 doesn't been attached before the first test period is done.

During a second test period in the test mode, the driving unit 201 provides the driving signal, and when the potential of the detection signal Ssen is substantially equal to the potential (VDD) of the high voltage source PVDD or the potential (VSS) of the low voltage source PVSS, it is determined that the light-emitting element 202 is in a failed state. In the embodiment, the second test period occurs after the first test period, that is, the second test period follows the first test period. According to another embodiment of the present disclosure, when the driving unit 201 provides the driving signal in the display mode, the potential of the detection signal Ssen may further indicate whether at least one of the plurality of display data provided to the driving circuit 200 needs to be compensated according to a potential of the detection signal Ssen.

FIG. 1B is a circuit diagram of the driving circuit 200 shown in FIG. 1A according to the first embodiment of the present disclosure. In FIG. 1B, the driving unit 201 (indicated by broken lines) comprises a first transistor T1, a second transistor T2, and a capacitor Cst, wherein the first transistor T1 is implemented by an NMOS transistor, and the second transistor T2 is implemented by a PMOS transistor. The first transistor T1 has a first terminal coupled to the data line (DL) to receive a plurality of display data, a second terminal coupled to a second node N2, and a conductive terminal to receive a first control signal CS1. In the embodiment, when an enable pulse appears on the first control signal CS1, the first control signal CS1 has a high potential. The capacitor Cst has a first terminal coupled to the second node N2 and a second terminal coupled to the high voltage source PVDD. The second transistor T2 has a first terminal coupled to the high voltage source PVDD, a second terminal coupled to the first node N1, and a conductive terminal coupled to the second node N2. When the first transistor T1 is turned on since its conductive terminal receives the first control signal CS1 with the high potential, the capacitor Cst is charged by the voltage of at least one of the plurality of display data. When the first control signal CS1 is switched to a low potential to turn off the first transistor T1, the capacitor Cst supplies a voltage to the conductive terminal of the second transistor T2, so that the second transistor T2 is turned on to provide a conduction path between the high voltage source PVDD and the first node N1 to allow a driving current to flow through the light-emitting element 202 to cause it to emit light.

In FIG. 1B, the light-emitting element 202 is implemented by a light-emitting diode D1. The anode of the light-emitting diode D1 is coupled to the first node N1, and the cathode thereof is coupled to the low voltage source PVSS. The low voltage source PVSS is coupled to the low voltage potential (VSS). When the voltage difference between the anode and the cathode of the light-emitting diode D1 is larger than the forward bias (indicated by Vf) of the light-emitting diode D1, the light-emitting diode D1 is in an emitting state.

The detection unit 203 comprises a third transistor T3 coupled to a detection line SEN. The third transistor T3 is implemented by an NMOS transistor. The third transistor T3 has a first terminal coupled to the first node N1, a second terminal coupled to the detection line SEN at the detection node Nsen, and a conductive terminal to receive a second control signal CS2. In this embodiment, when an enable pulse appears on the second control signal CS2, the second control signal CS2 has a high potential. According to an embodiment of the present disclosure, in cases where the driving unit 201 provides the driving signal during the second test period in the test mode, when the conductive terminal of the third transistor T3 receives the second control signal CS2 with the high potential, the third transistors T3 is turned on, and the detection line SEN receives a first potential of the first node N1, so that the potential of the detection signal Ssen at the detection node Nsen is substantially equal to the first potential. The state of the light-emitting element 202 during the second test period in the test mode can be as shown in the following table, Table 1:

TABLE 1

| The potential of the detection signal Ssen (=the first potential of the first node N1) | The state of the light-emitting element 202 |
|---|---|
| VSS + Vf | Emitting state |
| VSS | Short-circuit state |
| VDD | Open-circuit state |

When the potential of the detection signal Ssen is substantially equal to the potential (VDD) of the high voltage source PVDD, it is determined that the light-emitting element 202 is in the open-circuit state. When the potential of the detection signal Ssen is substantially equal to the potential (VSS) of the low voltage source PVSS, it is determined that the light-emitting element 202 is in the short-circuit state. The above open-circuit state and short-circuit state may indicate that the light-emitting element 202 is in a failed state, for example, the light-emitting element 202 is not properly mounted between the first node N1 and the low voltage source PVSS, or the light-emitting element 202 itself is failed, etc. In addition, when the potential of the detection signal Ssen is substantially equal to the sum (VSS+Vf) of the potential of the low voltage source PVSS and the forward bias voltage of the light-emitting diode D1, it is determined that the light-emitting element 202 is in an emitting state, that is, in a normal operation state.

According to an embodiment of the disclosure, in cases where the driving unit 201 provides the driving signal during the first test period in the test mode, when the second control signal CS2 is at the high potential and the third transistor T3 operates normally (that is, the third transistor is in a normal operation state), the third transistor T3 is turned on, and the potential of the detection signal Ssen at the detecting node Nsen is substantially equal to the first potential of the first node N1; when the second control signal CS2 is at the high potential and the third transistor T3 is failed (that is, the third transistor is in a non-normal operation state), the potential of the detection signal Ssen at the detection node Nsen is not equal to the first potential of the first node N1. Therefore, during the first test period, whether the third transistor T3 is in a failed state (non-normal operation state) can be determined according to the potential of the detection signal Ssen.

According to another embodiment of the present disclosure, in cases where the driving unit 201 provides the driving signal in the display mode, when the conductive terminal of the third transistor T3 receives the second control signal CS2 with the high potential to turn on the third transistor T3, the potential of the detection signal Ssen at the detection node Nsen is substantially equal to the first potential of the first node N1. At this time, the magnitude of the potential of the detection signal Ssen can be used as a basis for determining whether at least one of the plurality of display data supplied to the driving circuit 200 needs to be compensated according to a potential of the detection signal.

Figure 2A:
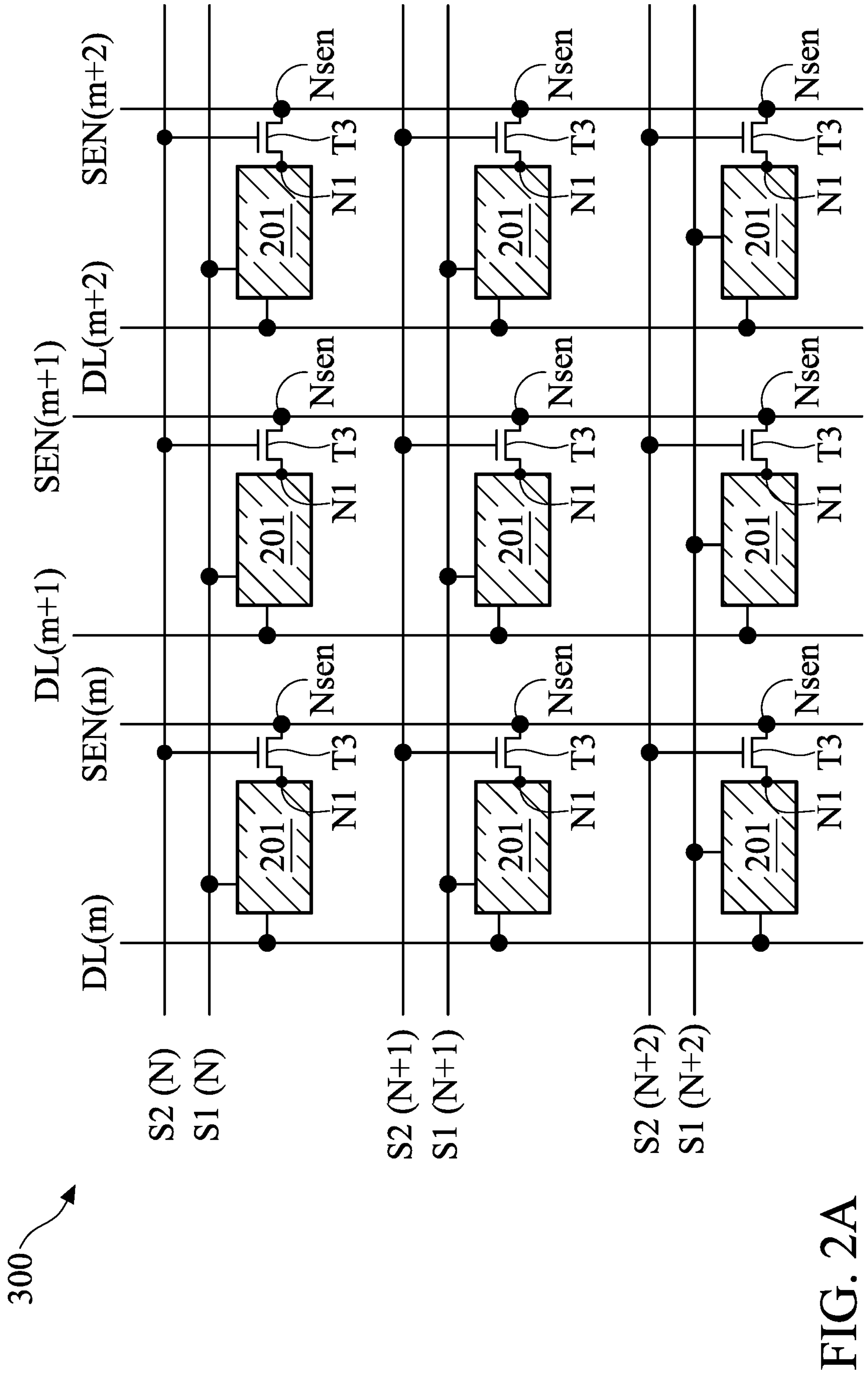
FIG. 2A is a schematic diagram showing a panel pixel circuit according to the first embodiment of the present disclosure.
Figure 2B:
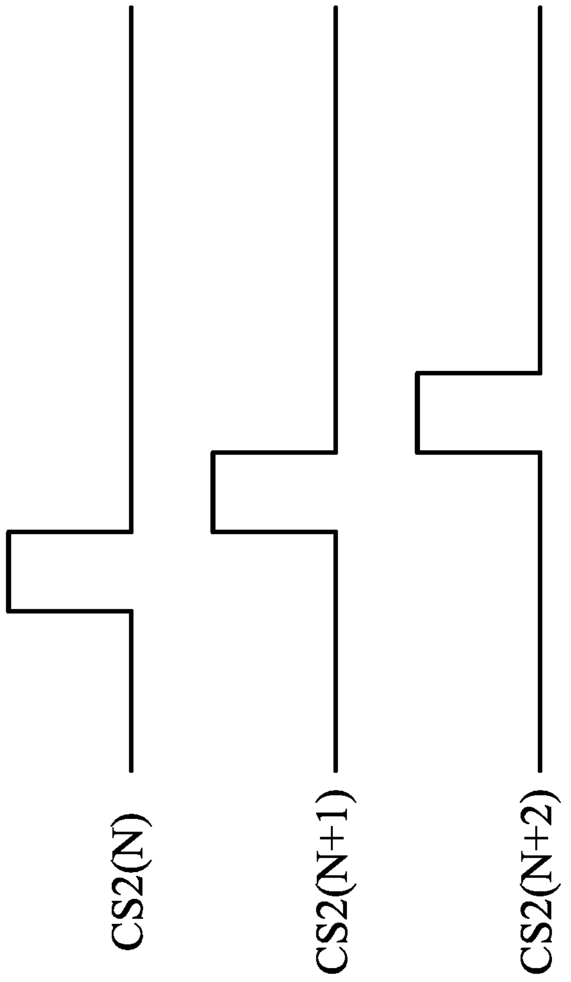
FIG. 2B is a timing chart of control signals according to the first embodiment of the present disclosure.

FIG. 2A is a schematic diagram showing a panel pixel circuit 300 of a tiled electronic device according to the first embodiment of the present disclosure. Referring to FIG. 2A, the panel pixel circuit 300 comprises a plurality of data lines (DL), a plurality of detection lines SEN, a plurality of first scan lines S1, and a plurality of second scan lines S2 and further comprises a plurality of driving units 201 and a plurality of third transistors T3 configured as FIGS. 1A and 1B to form a pixel array. In order to clarify the operation principle of the panel pixel circuit 300 shown in FIG. 2A, the light-emitting elements 202 are omitted here. The panel pixel circuit 300 is configured to connect the plurality of driving units 201 to the respective data lines (DL), the detection lines SEN, the first scan lines S1, and the second scan lines S2 according to the design requirements of the active matrix display panel. Each of the third transistors T3 has a first terminal, a second terminal, and a conductive terminal. For each third transistor T3, the first terminal is coupled to the first node N1 of the driving unit 201, the second terminal is coupled to one of the detection lines, and the conductive terminal is coupled to one of the second scan lines S2 for receiving the second control signal CS2. In the embodiment, the panel pixel circuit 300 comprises a 3×3 matrix array comprising three columns of data lines DL(m)~DL(m+2), three columns of detection lines SEN(m)~SEN(m+2), and three rows of first scan lines S1(N)~S1(N+2), and three rows of second scan lines S2(N)~S2(N+2). In addition, it should be understood that the panel pixel circuit 300 may further comprise a timing controller and a data driver. The timing controller is electrically connected to each of the first scan lines S1 and each of the second scan lines S2 to provide the first control signal CS1 and the second control signal CS2, respectively, for providing a plurality of display data to the driving units 201 in conjunction with the data driver. Each of the detection lines is electrically connected to the corresponding detection node to couple the potential of the detection signal to a readout circuit (not shown) to determine the states of the light-emitting elements or the detection units. FIG. 2B is a timing chart of the control signals according to the first embodiment of the present disclosure. In order to sequentially read the first potentials of the driving units 201, the time periods during which the enable pulses appear respectively on the second control signals CS2(N), CS2(N+1), and CS2(N+2) on the first row, the second row, and the third row are arise sequentially. In other words, the enable pulses respectively on the second control signals CS2(N), CS2(N+1), and CS2(N+2) are separated in timing.

Figure 3:
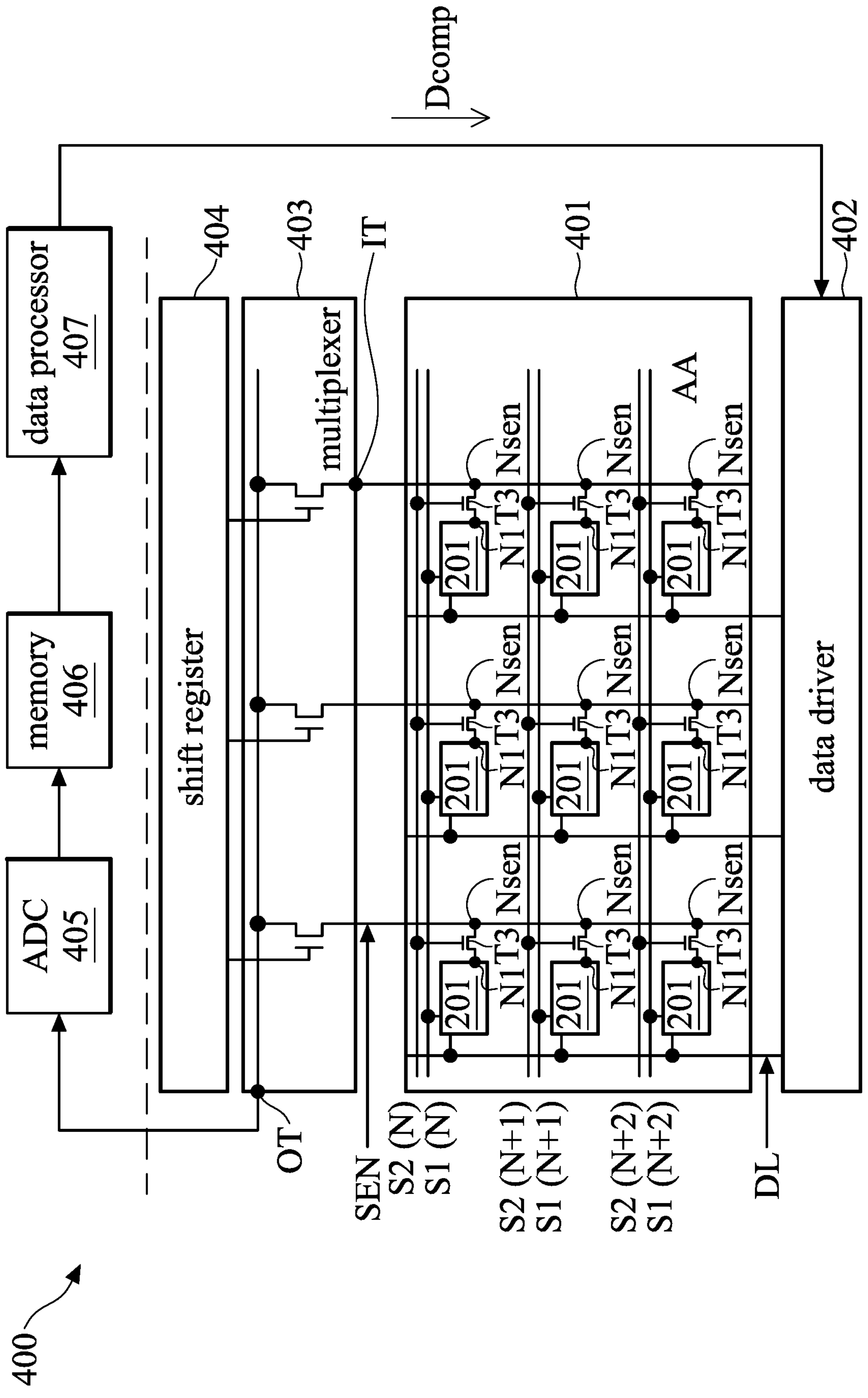
FIG. 3 is a schematic view showing a display panel according to the first embodiment of the present disclosure.

FIG. 3 is a schematic view showing a display panel 400 of a tiled electronic device according to the first embodiment of the present disclosure. The shape of the display panel 400 could be designed to have a polygonal shape, a circular shape, an oval shape, or an arbitrary shape, and the size of the display panels 400 also could be determined according to system or designer's requirements, however, the disclosure is not limited thereto. The display panel 400 may operate in a plurality of operation modes, including a test mode and a display mode. The test mode described herein is an operation mode of the display panel 400 prior to shipment, and the display mode described herein is an operation mode after the display panel 400 is shipped. The display panel 400 comprises an active area (AA) 401. At least part of a plurality of data lines (DL) and at least part of a plurality of detection lines (SEN) are disposed on the active area 401. The display panel 400 further comprises a data driver 402, a multiplexer 403, a shift register 404, an analog-to-digital converter. (ADC) 405, a memory 406, and a data processor 407 which are disposed on the area outside of the active area 401, however the disclosure is not limited thereto, the person skilled in the art of present disclosure could add or reduce the above elements following system or designer's requirements. In the embodiment, display panel 400 further comprises the panel pixel circuit 300 disposed on the active area 401 of FIG. 2A. For clarity, only a portion of the panel pixel circuit 300 is shown, and the disclosure is not limited to a 3×3 matrix array. It should be understood that the data driver 402 is connected to the plurality of data lines (DL) to provide a plurality of display data to the respective driving units 201 located in the active area 401. In addition, the display panel 400 may comprise a readout circuit which at least comprises the multiplexer 403, the shift register 404, the analog-to-digital converter (ADC) 405, the memory 406, and the data processor 407, however, the disclosure is not limited thereto. It should be noted that the analog-to-digital converter 405, the memory 406, and the data processor 407 may be disposed in a peripheral area of the display panel 400 (indicated by broken lines).

The multiplexer 403 comprises a plurality of input terminals (IT) and an output terminal (OT). The input terminals (IT) are coupled to the plurality of detection nodes Nsen corresponding to the plurality of driving units 201 for sequentially receiving the detection signals Ssen and transmitting them to the output terminal (OT). The input terminals (IT) of the multiplexer 403 are respectively connected to the detection lines SEN and coupled to the detection nodes Nsen through the detection lines SEN. The multiplexer 403 comprises a plurality of transistors. The shift register 404 sequentially turns on the transistors of the multiplexer 403, so that the multiplexer 403 can sequentially transmit the respective detection signals Ssen from the input terminals (IT) of the multiplexer 403 to the output terminal (OT) thereof. Next, the analog-to-digital converter 405 is connected to the output terminal (OT) of the multiplexer 403 to convert the potential of each detection signal Ssen into a digital signal. The memory 406 sequentially stores the digital signals of the detection signals Ssen and transmits them to the data processor 407.

According to an embodiment of the present disclosure, during the second test period in the test mode, the data processor 407 determines the states of the light-emitting elements (the emitting state, the short-circuit state, or the open-circuit state) according to the received digital signals based on the rule shown in Table 1. Therefore, the readout circuit can determine the position in the active area where the failed light-emitting element is disposed and further determine that the failed light-emitting element is in a short-circuit state or open-circuit state.

According to another embodiment of the present disclosure, during the first test period in the test mode, the data processor 407 determines whether a third transistor T3 operates normally or not according to the received corresponding digital signal. Thus, the readout circuit can determine the position in the active area where the failed third transistor T3 is disposed. When it is determined that the third transistor T3 is failed, the data processor 407 can send a state indication signal to a test apparatus to indicate a failed state of the third transistor T3. According to an embodiment, when receiving the state indication signal, the test apparatus can cut off the connection between the first terminal of the third transistor T3 and the first node N1 or the connection between the second terminal of the third transistor T3 and the detection node Nsen, for example, by using laser cutting.

According to another embodiment of the present disclosure, in the display mode, the data processor 407 determines whether at least one of the plurality of display data needs to be compensated based on the received digital signal(s). When determining that at least one of the plurality of display data provided to a driving unit 201 is to be compensated according to a potential of the detection signal, the data processor 407 obtains a corresponding compensation value according to the received digital signal, for example, by checking a look-up table and provides a compensation control signal Dcomp to the data driver 402. The data driver 402 compensates at least one of the plurality of display data corresponding to the driving unit 201 according to the compensation control signal Dcomp. For example, the data driver 402 increases or decreases the voltage value represented by at least one of the plurality of display data.

Figure 4B:
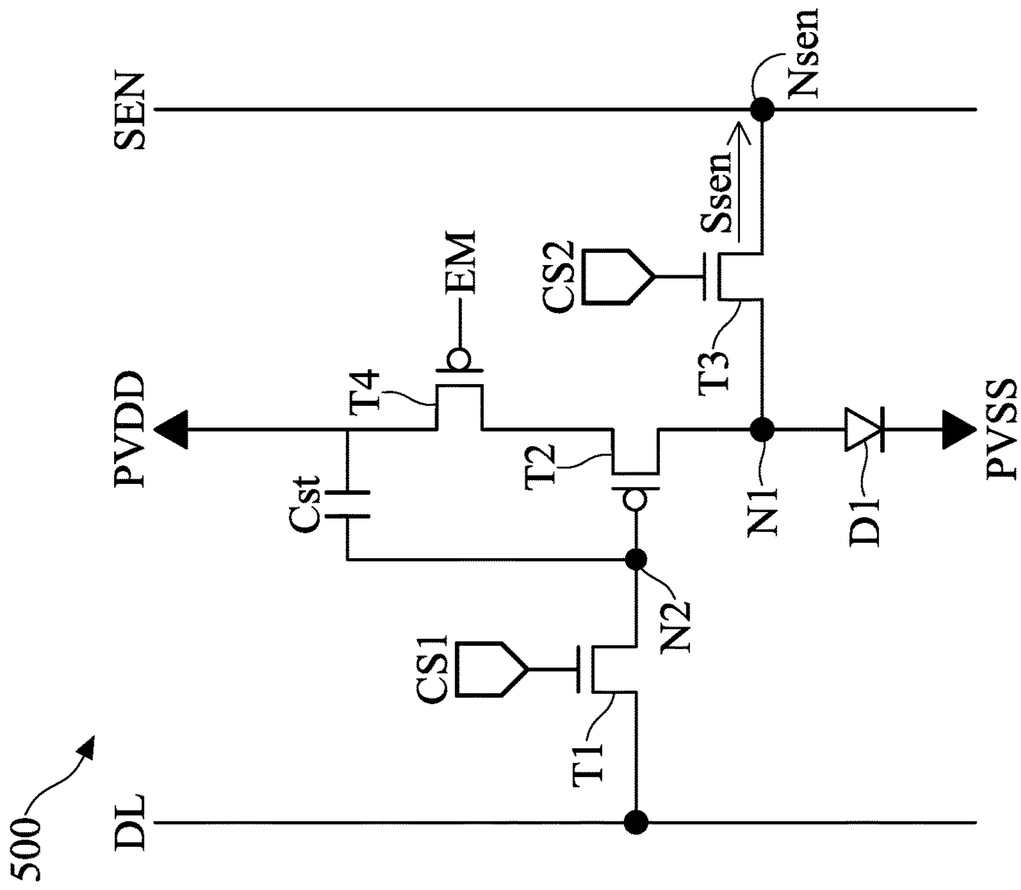
FIG. 4A and FIG. 4B show variations of the driving circuits according to the first embodiment of the present disclosure.
Figure 4A:
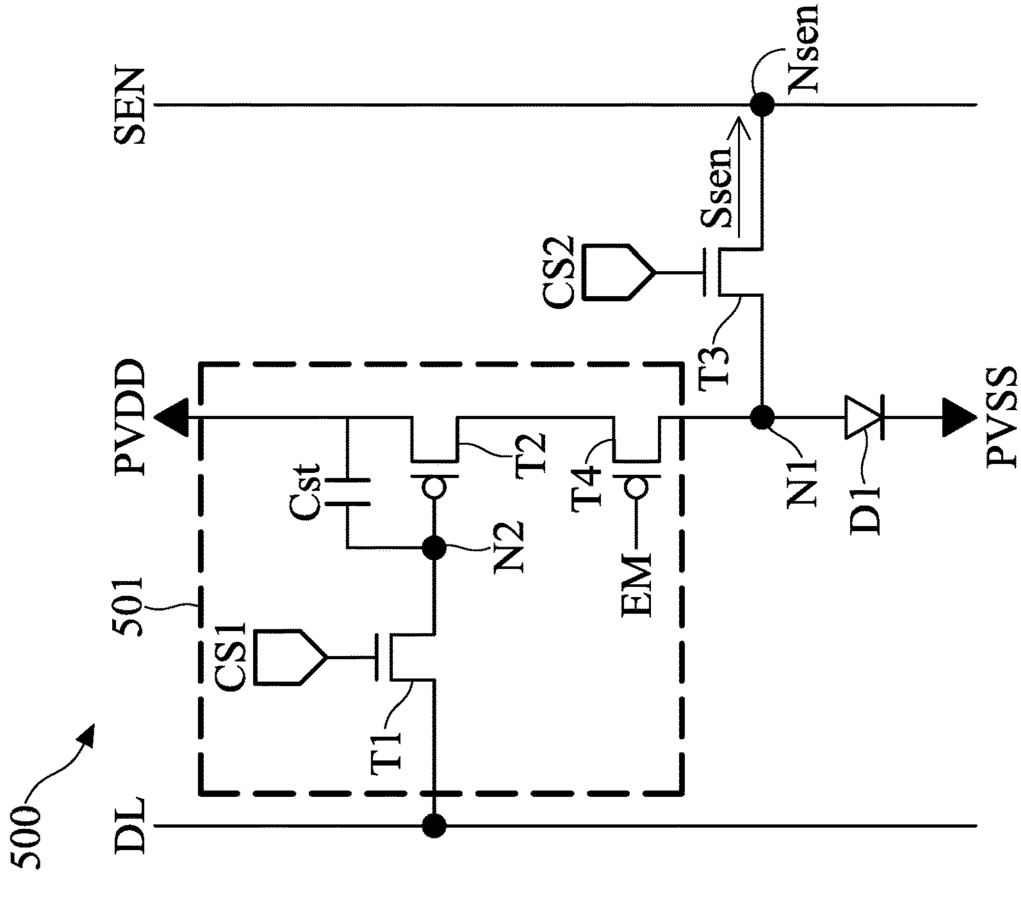

FIGS. 4A~4B show variations of the driving circuit 500 according to the first embodiment of the present disclosure. FIGS. 4C~4F show variations of the driving circuits 500 according to a second embodiment of the present disclosure. FIG. 4A shows a variation of the driving circuit shown in FIG. 1B, and the same components and functions in FIGS. 1B and 4A will not be described herein. The difference between the circuits shown in FIG. 4A and FIG. 1B is that the driving unit 501 (indicated by broken lines) further comprises a fourth transistor T4. The fourth transistor T4 is implemented by a PMOS transistor. The fourth transistor T4 has a conductive terminal, a first terminal, and a second terminal. The conductive terminal of the fourth transistor T4 is configured to receive a third control signal EM. The first terminal and the second terminal of the fourth transistor T4 are respectively coupled to the second terminal of the second transistor T2 and the first node N1. The fourth transistor T4 is controlled by the low voltage potential of the third control signal EM to provide the conduction path between the high voltage source PVDD and the first node N1; conversely, the fourth transistor T4 is controlled by the high voltage potential of the third control signal EM to cut off the conduction path.

Similarly, FIG. 4B shows one variation of the driving circuit shown in FIG. 4A. In FIG. 4B, the first terminal and the second terminal of the fourth transistor T4 are coupled to the high voltage source PVDD and the first terminal of the second transistor T2, respectively.

Figure 4D:
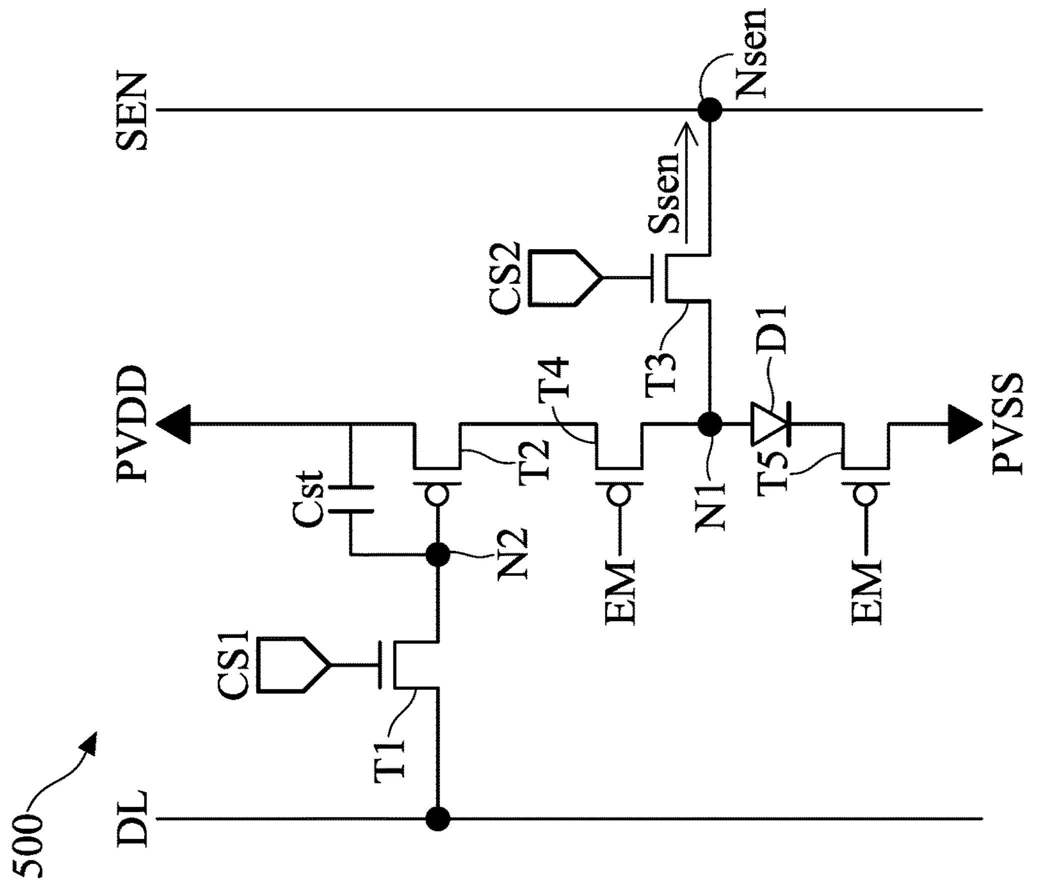
FIGS. 4C~4F show variations of the driving circuits according to a second embodiment of the present disclosure.
Figure 4C:
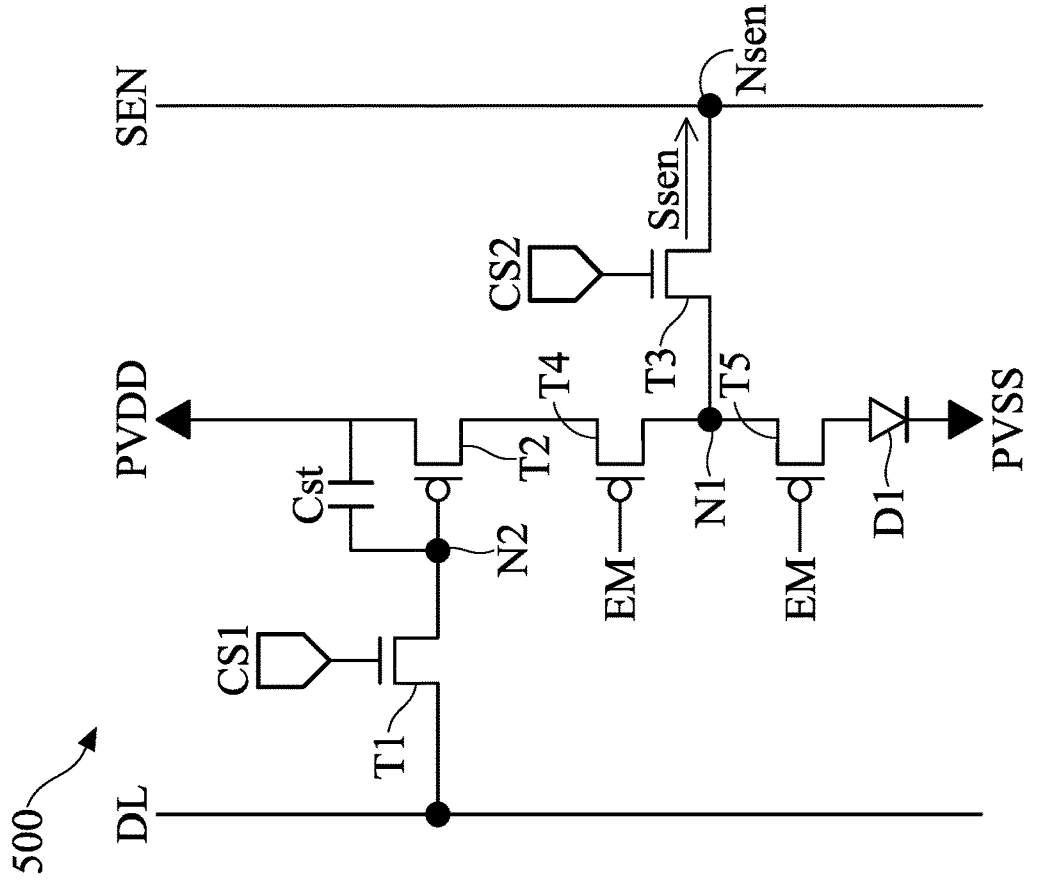

FIG. 4C shows another variation of the driving circuit shown in FIG. 4A. The same components and functions in FIGS. 4A and 4C will not be described herein. The difference between the circuits shown in FIGS. 4A and 4C is that the driving unit 501 further comprises a fifth transistor T5. The fifth transistor T5 is implemented by a PMOS transistor. The fifth transistor T5 has a conductive terminal, a first terminal, and a second terminal. The conductive terminal of the fifth transistor T5 is configured to receive the third control signal EM. The first terminal and the second terminal of the fifth transistor T5 are respectively coupled to the first node N1 and the first terminal of the light-emitting element. The fifth transistor T5 is controlled by the low voltage potential of the third control signal EM to provide the conduction path between the first node N1 and the first terminal of the light-emitting element; conversely, the fifth transistor T5 is controlled by the high voltage potential of the third control signal EM to cut off the conduction path.

FIG. 4D shows a variation of the driving circuit shown in FIG. 4C. The difference between the circuits shown in FIGS. 4D and 4C is that the first terminal and the second terminal of the fifth transistor T5 are respectively coupled to the second terminal of the light-emitting element and the low voltage source PVSS.

Figure 4F:
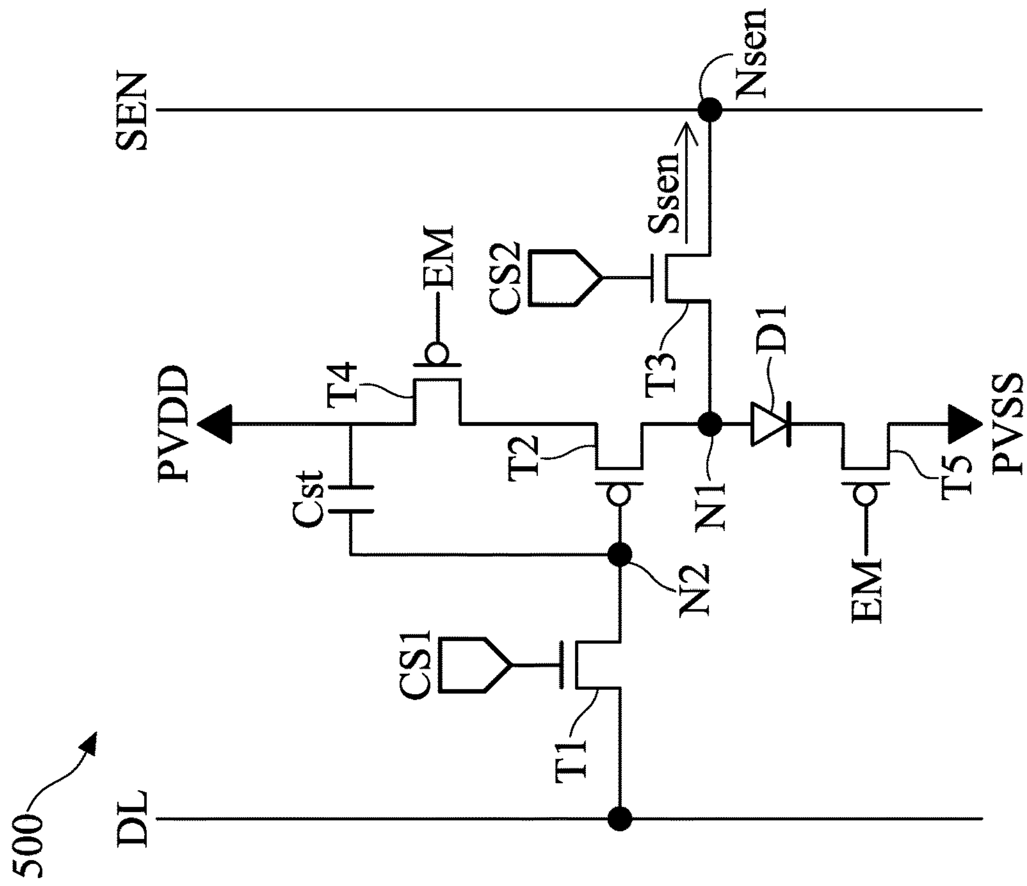
Figure 4E:
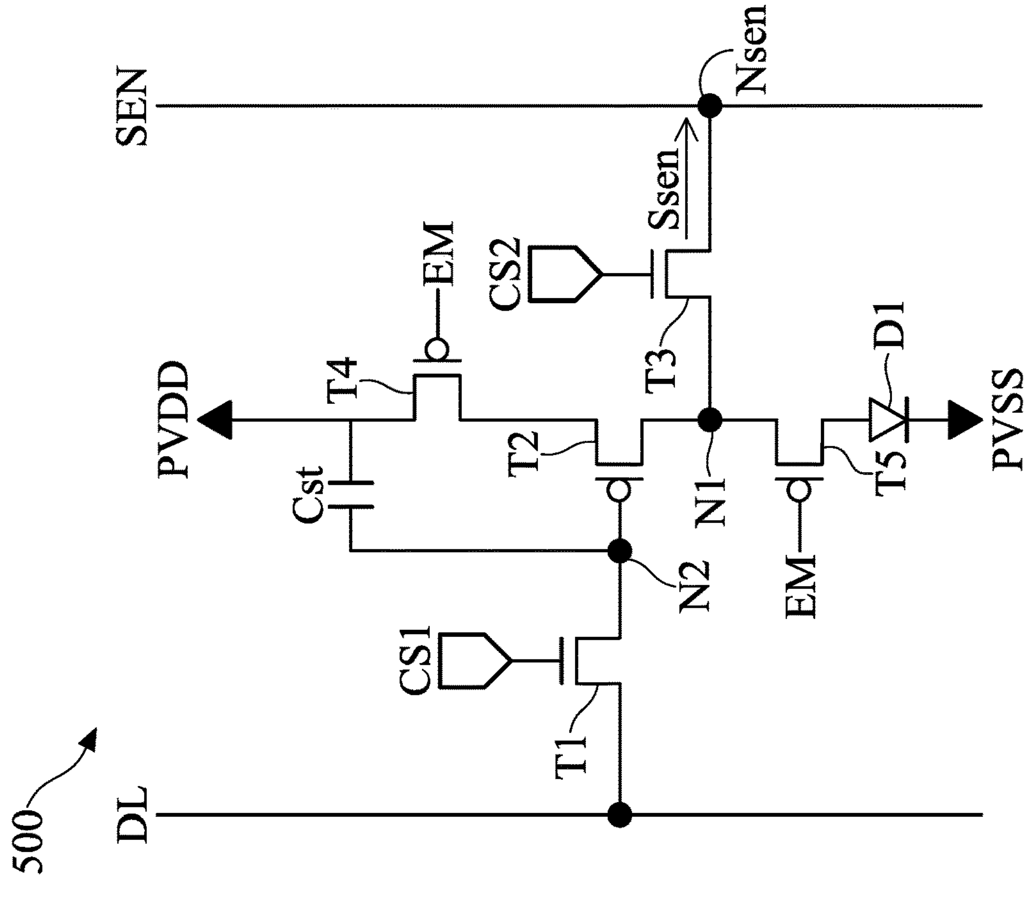

FIG. 4E shows a variation of the driving circuit shown in FIG. 4B. The difference between the circuits shown in FIGS. 4E and 4B is that the driving unit 501 further comprises a fifth transistor T5. The fifth transistor T5 is implemented by a PMOS transistor. The fifth transistor T5 has a conductive terminal, a first terminal, and a second terminal. The conductive terminal of the fifth transistor T5 is configured to receive the third control signal EM. The first terminal and the second terminal of the fifth transistor T5 are respectively coupled to the first node N1 and the first terminal of the light-emitting element. The fifth transistor T5 is controlled by the low voltage potential of the third control signal EM to provide the conduction path between the first node N1 and the first terminal of the light-emitting element; conversely, the fifth transistor T5 is controlled by the high voltage potential of the third control signal EM to cut off the conduction path the first node N1 and the first terminal of the light-emitting element.

FIG. 4F shows a variation of the driving circuit shown in FIG. 4E. The difference between the circuits shown in FIGS. 4F and 4E is that the first terminal and the second terminal of the fifth transistor T5 are respectively coupled to the second terminal of the light-emitting element and the low voltage source PVSS.

Figure 5A:
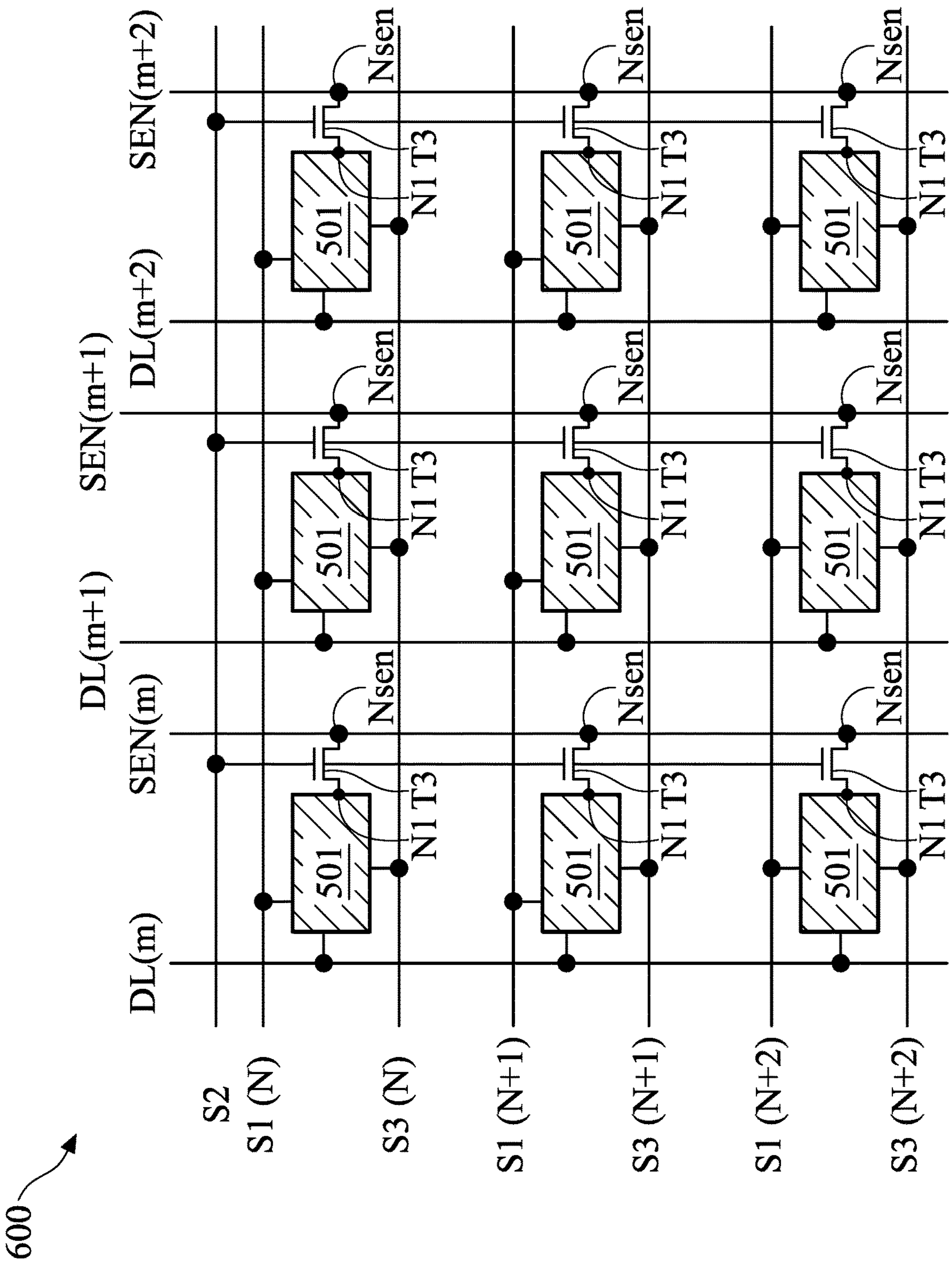
FIG. 5A is a schematic diagram showing a panel pixel circuit according to the second embodiment of the present disclosure.
Figure 5B:
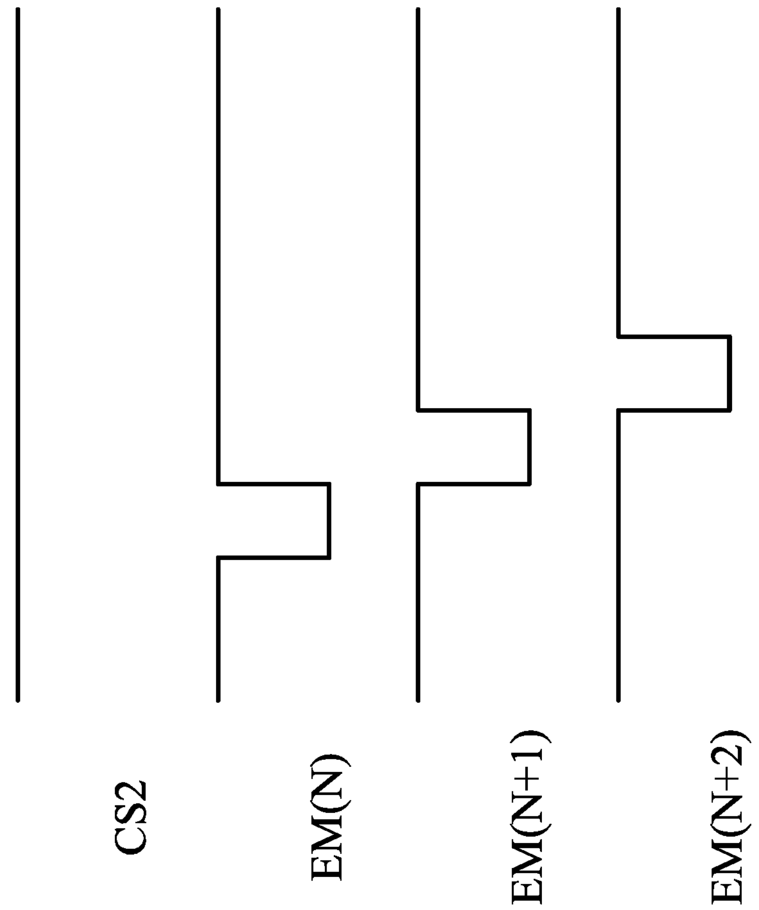
FIG. 5B is a timing chart of control signals according to the second embodiment of the present disclosure.

FIG. 5A is a schematic diagram showing a panel pixel circuit 600 of a tiled electronic device according to the second embodiment of the present disclosure. The panel pixel circuit 600 of FIGS. 5A and 5B comprise the drive circuit 500 shown in one of FIGS. 4A~4F. The same components and functions in FIG. 5A and FIG. 2A will not be described herein again. The difference between the circuits shown in FIG. 5A and FIG. 2A is that the panel pixel circuit 600 comprises the driving unit 501 and the third transistor T3 shown in one of FIGS. 4A-4F to form a pixel array. In addition, there is only one second scan line S2 in the panel pixel circuit 600, and three rows of third scan lines S3(N)~S3(N+2) are added for receiving the third control signals EM(N), EM(N+1), and EM(N+2). The conductive terminal of each of the third transistors T3 is connected to the second scan line S2 to receive the second control signal CS2. FIG. 5B is a timing chart of the control signals according to the second embodiment of the present disclosure. Based on the configuration of the panel pixel circuit of FIG. 5A, the second control signal CS2 is continuously maintained at a high potential (keep "Hi") to turn on each of the third transistors T3. As shown in FIG. 5B, the driving units 501 on the same row are coupled to the sane third scan line, and the time periods during which the enable pulses (high level) appear respectively on the third control signals EM(N), EM(N+1), and EM(N+2) on the third scan lines S3(N)~S3(N+2) arise sequentially. Thus, the transistors T4 (the embodiments of FIGS. 4A and 4B) or the transistors T4 and T5 (embodiments of FIGS. 4C~4F) of the drive circuits 500 on the same row are turned on at the same time, while the transistors T4 (the embodiments of FIGS. 4A and 4B) or the transistors T4 and T5 (embodiments of FIGS. 4C~4F) of the drive circuits 500 on the same column are not turned on at the same time, so that the first potentials of the driving units 501 can be read sequentially due to the sequential enable pulses of the EM(N), EM(N+1), and EM(N+2). It should be noted that the fourth transistor T4 and the fifth transistor T5 are implemented by PMOS transistors, so when the third control signal EM is at a low potential, the fourth and fifth transistors T4/T5 are turned on.

Figure 6:
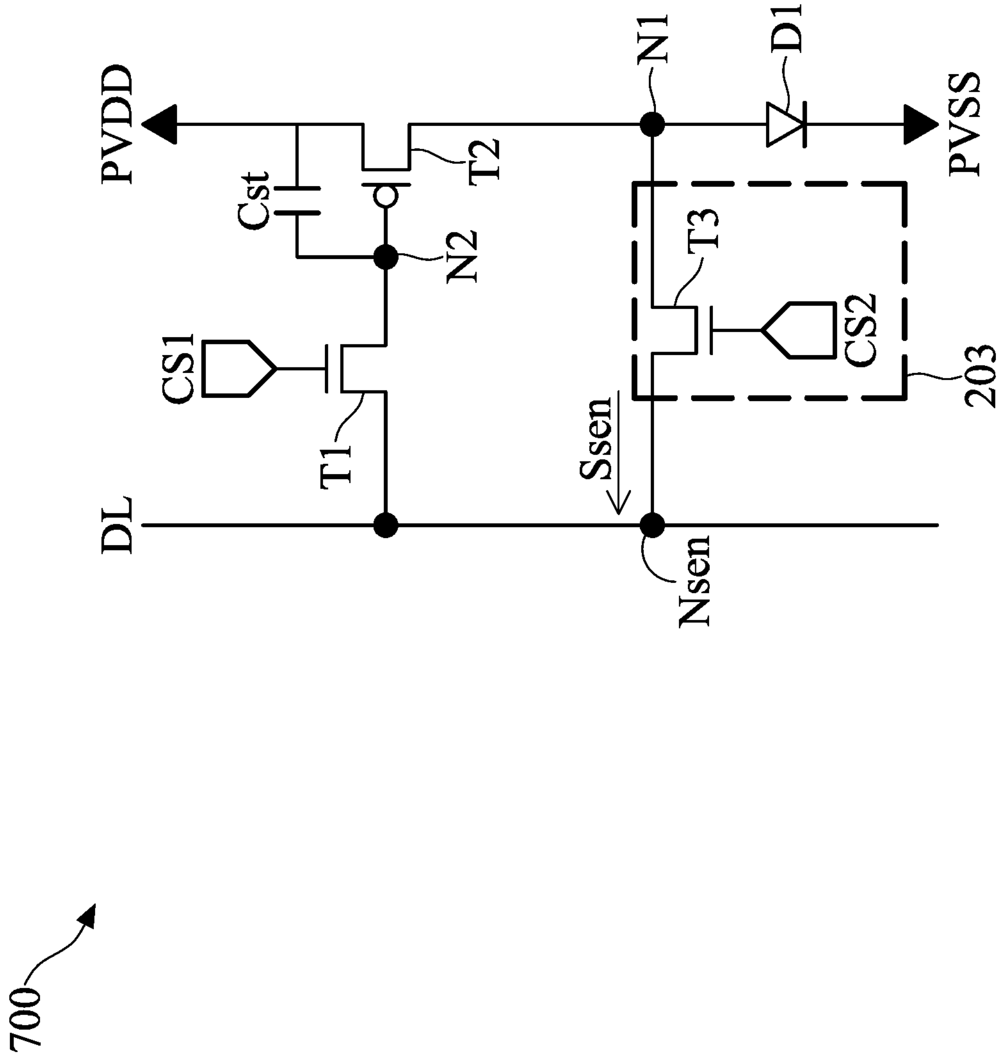
FIG. 6 is a schematic view showing a driving circuit according to a third exemplary embodiment the present disclosure.

FIG. 6 is a schematic view of a driving circuit 700 according to a third embodiment the present disclosure. The circuit shown in FIG. 6 is another variation of the driving circuit 200 shown in FIG. 1B, and the same components and functions will not be described herein. The difference between the circuits shown in FIG. 6 and FIG. 1B is that the detection line is omitted and replaced with the existing data line (DL). The second terminals of the third transistor T3 of the detection unit is coupled to the data line (DL). That is, the data line (DL) also acts as the original detection line. In detail, the first terminal of the third transistor T3 of the detection unit 203 is coupled to the first node N1, and the second terminal of the detection unit 203 is coupled to the data line (DL) at the detection node Nsen.

Figure 7A:
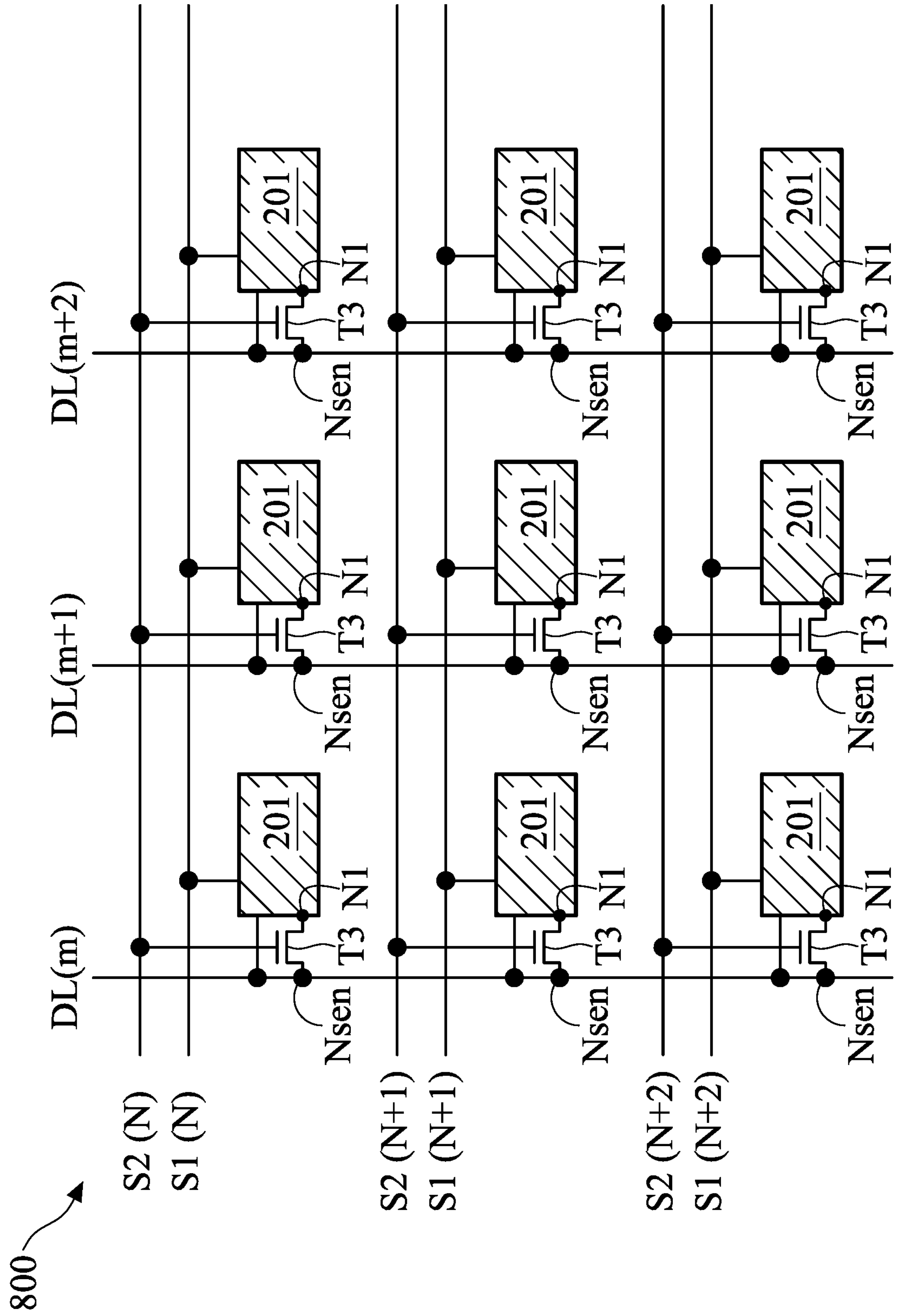
FIG. 7A is a schematic diagram showing a panel pixel circuit according to the third embodiment of the present disclosure.
Figure 7B:
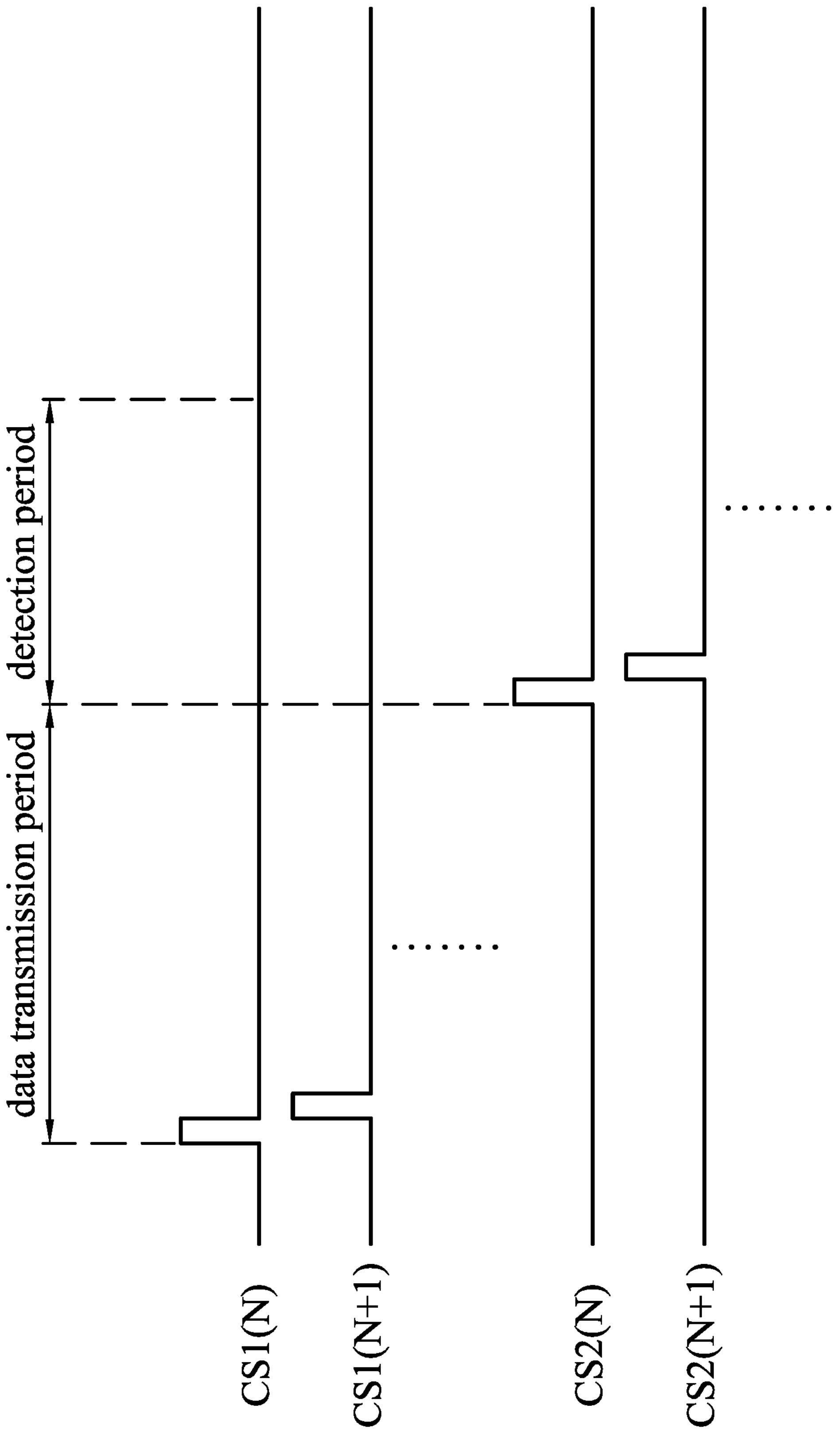
FIGS. 7B and 7C are timing charts of control signals according to the third embodiment of the present disclosure.
Figure 7C:
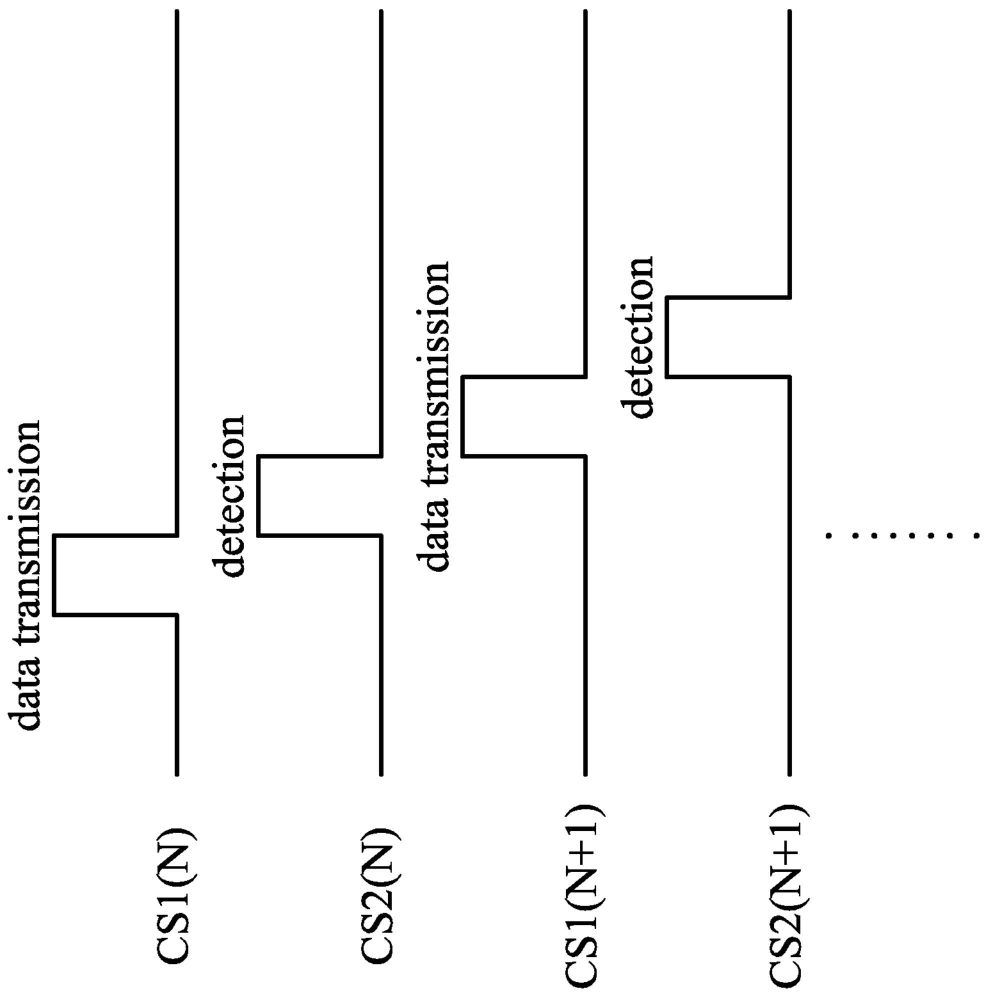

FIG. 7A is a schematic diagram showing a panel pixel circuit 800 according to the third embodiment of the present disclosure. The panel pixel circuit 800 of FIG. 7A comprises the driving circuit 700 of FIG. 6. The difference between the circuits shown in FIG. 7A and FIG. 2A is that the original detection lines shown in FIG. 2A are omitted. For one third transistor T3 on a column, the second terminal is coupled to the data line (DL) on the same column. FIGS. 7B and 7C are timing charts of control signals according to the third embodiment of the present disclosure. Based on the configuration of the panel pixel circuit of FIG. 7A, since the data lines (DL) also serve as the above detection lines, each driving unit 201 operates in two different periods, a data transmission period and a detection period. As shown in FIG. 7B, the enabled pulses of the first control signal CS1 are sequentially sent during data transmission. After the data transmission is completed, the enabled pulses of the second control signal CS2 are sequentially sent during the detection period. Thus, the readout circuit can sequentially read the first potentials of the driving units 201. Alternatively, as shown in FIG. 7C, after the enable pulse of the first control signal CS1 on one row (Nth row) is sent, the enable pulse of the corresponding second control signal CS2 on the same row is sent. Then, the enable pulse of the first control signal CS1 and the enable pulse of the second control signal CS2 on the next row ((N+1)-th row) are sent sequentially. In other words, a plurality of the enable pulses of the first control signal CS1 and a plurality of the enable pulses of the second control signal CS2 are separated in timing. Accordingly, the readout circuit can sequentially read the first potentials of the drive units 201.

Figure 8:
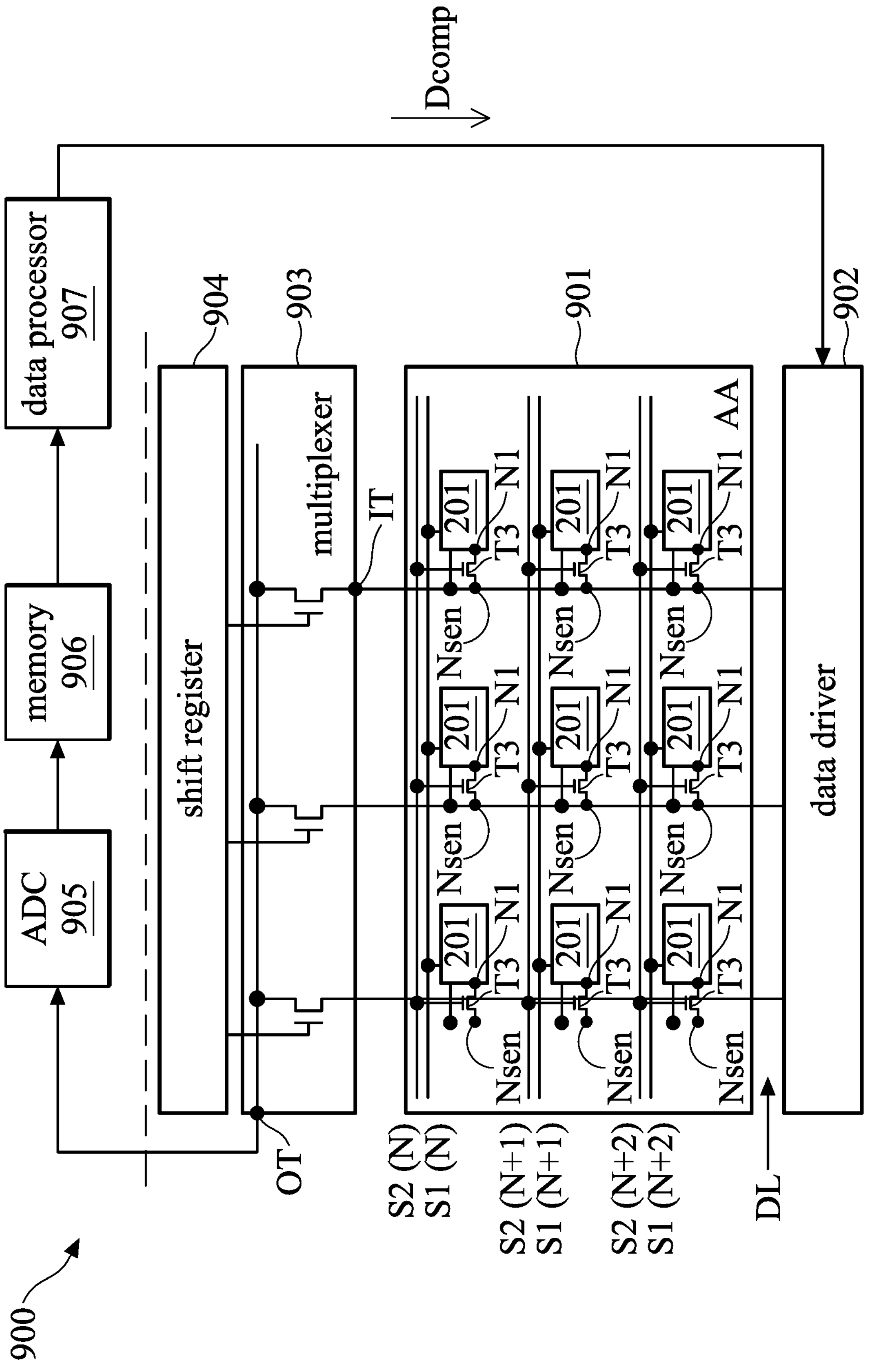
FIG. 8 is a schematic view showing a display panel according to the third embodiment of the present disclosure.

FIG. 8 is a schematic view showing a display panel 900 according to the third embodiment of the present disclosure. The difference between display panels shown in FIG. 8 and FIG. 3 is that, in the display panel 900, the detection lines shown in FIG. 3 are omitted, and the data lines (DL) also act as the detection lines shown in FIG. 3. In FIG. 8, the inputs of the multiplexer 903 are coupled to the detection nodes Nsen corresponding to the driving units 201 through the data lines (DL), respectively. The multiplexer 903 can sequentially transmit the respective detection signals Ssen from the input terminals (IT) of the multiplexer 903 to the output terminal (OT) thereof while the shift register 904 controls the transistors in the multiplexer 903.

According to an embodiment of the present disclosure, during the second test period in the test mode, the data processor 907 determines the states of the light-emitting elements (the emitting state, the short-circuit state, or the open-circuit state) according to the received digital signals based on the rule shown in Table 1.

According to another embodiment of the present disclosure, during the first test period in the test mode, the data processor 907 determines whether a third transistor T3 operates normally or not according to the received corresponding digital signal. Thus, the readout circuit can determine the position in the active area where the failed third transistor T3 is disposed. When it is determined that the third transistor T3 is failed, the data processor 907 can sent a state indication signal to a test apparatus to indicate a failed state of the third transistor T3. According to an embodiment, when receiving the state indication signal, the test apparatus can cut off the connection between the first terminal of the third transistor T3 and the first node N1 or the connection between the second terminal of the third transistor T3 and the detection node Nsen, for example, by using laser cutting. According to another embodiment, at least one redundant transistor is additionally disposed in the active area 901. When receiving the state indication signal, the test apparatus can respectively couple the first and second terminals of one redundant transistor to the first node N1 and the detection node Nsen respectively to replace the failed third transistor T3, for example, by using laser welding.

According to another embodiment of the present disclosure, in the display mode, the data processor 907 determines whether at least on of the plurality of display data needs to be compensated based on the received digital signal(s). When determining that the at least one of plurality of display data provided to a driving unit 201 is to be compensated according to a potential of the detection signal, the data processor 907 obtains a corresponding compensation value according to the received digital signal, for example, by checking a look-up table and provides a compensation control signal Dcomp to the data driver 902. The data driver 902 compensates the at least one of the plurality of display data corresponding to the driving unit 201 according to the compensation control signal Dcomp. For example, the data driver 902 increases or decreases the voltage value represented by the at least one of the plurality of display data.

It should be noted that since the data lines (DL) also act as the detection lines, during a period when the detection circuit detects the potentials of the detection signals Ssen corresponding to respective driving units, the data driver 902 needs to set the outputs high impedance (Hi-Z) to avoid interference with the readout circuit during reading the first potentials of the respective drive units. Further, some or all portions of the data driver 902 and the readout circuit may be integrated in the same chip.

Figure 9A:
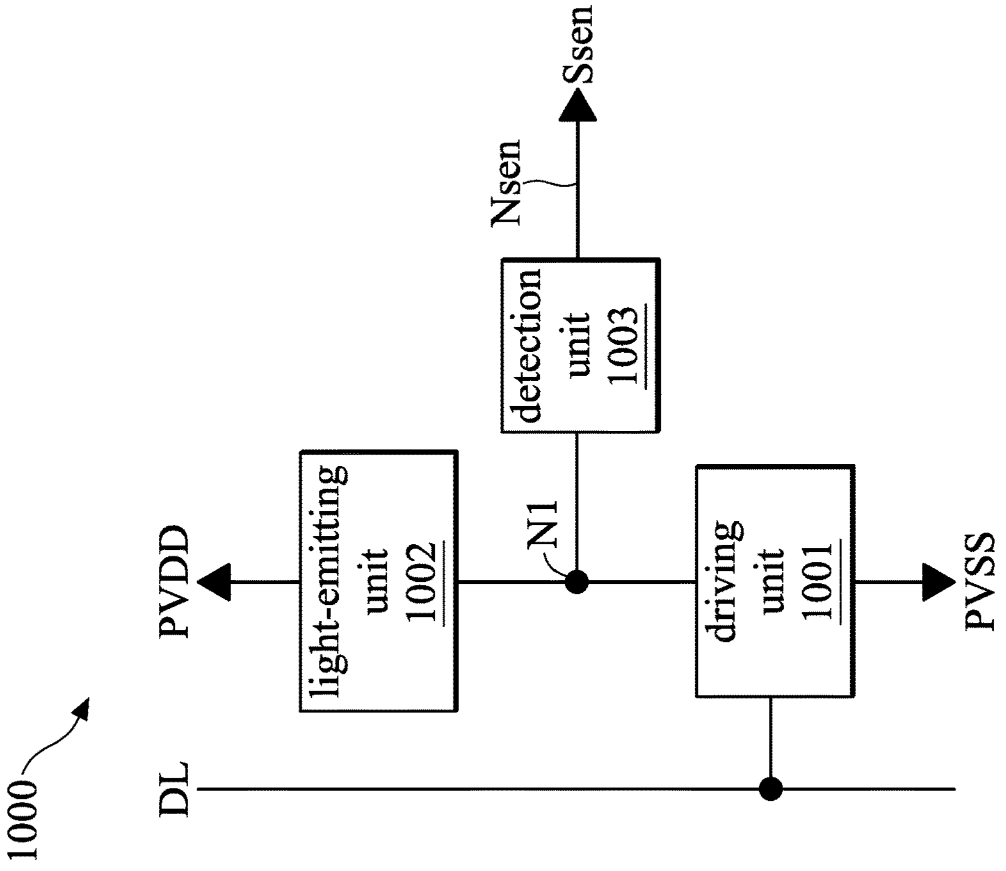
FIG. 9A is a schematic view showing a driving circuit according to a fifth exemplary embodiment the present disclosure.

FIG. 9A is a schematic view showing a driving circuit 1000 according to a fourth embodiment of the present disclosure. The circuit shown in FIG. 9A is similar to that shown in FIG. 1A, and the same components and functions will not be described herein. The difference between the circuits shown in FIGS. 9A and 1A is that, in the embodiment of FIG. 9A, the first voltage source is implemented as a low voltage source PVSS, and the second voltage source is implemented as high voltage source PVDD. In addition, the light-emitting device 1002 has a first terminal coupled to the high voltage source PVDD and a second terminal coupled to a first node (denoted by N1). The driving unit 1001 has a first terminal coupled to the first node N1, a second terminal coupled to a data line (DL) to receive a plurality of display data, and a third terminal coupled to the low voltage source PVSS. The driving unit 1001 provides a conduction path between the high voltage source PVDD and the first node N1 according to the plurality of display data to provide a driving signal to the first node N1.

The detection unit 1003 is coupled to the first node N1 and a detection node Nsen. The detection unit 1003 generates a detection signal Ssen at the detection node Nsen. According to an embodiment of the disclosure, when the driving circuit 1000 provides the driving signal in the test mode, the detection signal Ssen may indicate whether the driving unit 1001, light-emitting element 1002 or the detection unit 1003 is in a failed state. In detail, during a second test period in the test mode, the driving unit 1001 provides the driving signal, and when the potential of the detection signal Ssen is substantially equal to the potential (VDD) of the high voltage source PVDD or the potential (VSS) of the low voltage source PVSS, it is determined that the light-emitting element 1002 is in a failed state. During a first period in the test mode, the driving unit 1001 provides the driving signal, and when the potential of the detection signal Ssen is not as designed, it is determined that the detection unit 1003 is in a failed state. According to another embodiment of the present disclosure, when the driving unit 1001 provides the driving signal in the display mode, the potential of the detection signal Ssen may further indicate whether at least one of the plurality of display data provided to the driving circuit 1000 needs to be compensated according to a potential of the detection signal Ssen.

Figure 9B:
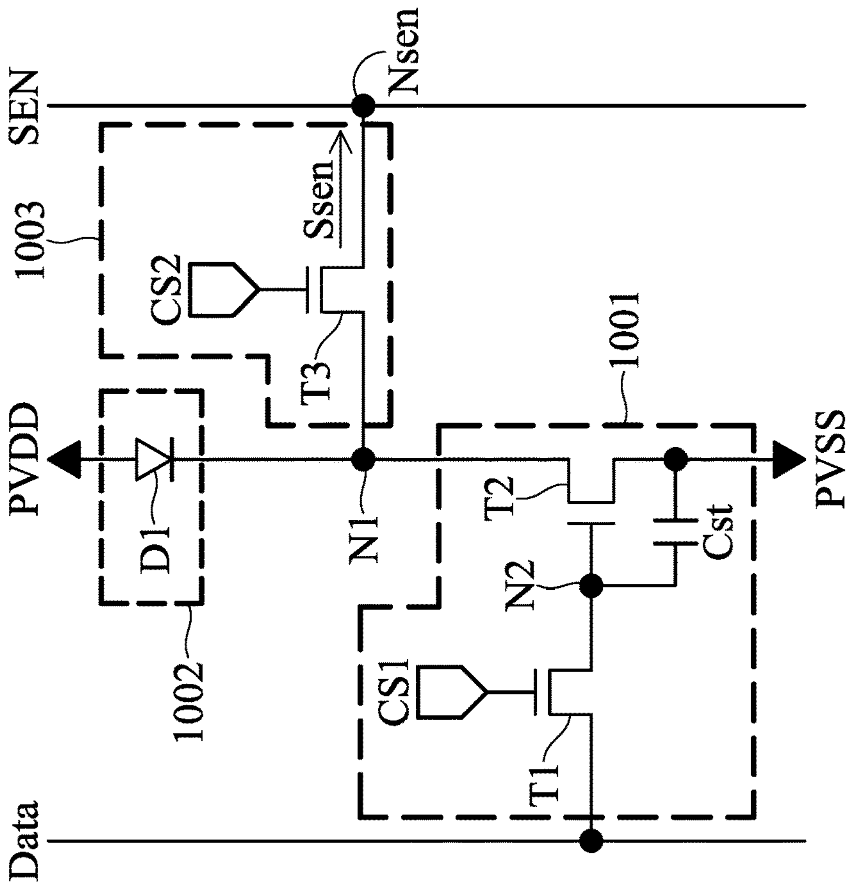
FIG. 9B is a circuit diagram of a driving circuit according to the fifth embodiment of the present disclosure.

FIG. 9B is a circuit diagram of the driving circuit 1000 shown in FIG. 9A according to the fourth embodiment of the present disclosure. The circuit shown in FIG. 9B is similar to that shown in FIG. 1B, and the same components and functions will not be described herein. The difference between the circuits shown in FIGS. 9B and 1B is that the driving unit 1001 comprises a first transistor T1, a second transistor T2, and a capacitor Cst, wherein both of the first transistors T1 and T2 are implemented by NMOS transistors. The first transistor T1 has a first terminal coupled to the data line (DL) to receive a plurality of display data, a second terminal coupled to a second node N2, and a conductive terminal to receive a first control signal CS1. In the embodiment, when an enable pulse appears on the first control signal CS1, the first control signal CS1 has a high potential. The capacitor Cst has a first terminal coupled to the second node N2 and a second terminal coupled to the low voltage source PVSS. The second transistor T2 has a first terminal coupled to the first node N1, a second terminal coupled to the low voltage source PVSS, and a conductive terminal coupled to the second node N2.

Similar to the driving circuit shown in FIG. 1B, the state of the light-emitting element 1002 during the second test period in the test mode can be as shown in the following table, Table 2:

TABLE 2

| The potential of the detection signal Ssen (=the first potential of the first node N1) | The state of the light-emitting element 202 |
|---|---|
| VDD-Vf | Emitting state |
| VDD | Short-circuit state |
| VSS | Open-circuit state |

When the potential of the detection signal Ssen is substantially equal to the potential (VSS) of the low voltage source PVSS, it is determined that the light-emitting element 1002 is in the open-circuit state. When the potential of the detection signal Ssen is substantially equal to the potential (VDD) of the high voltage source PVDD, it is determined that the light-emitting element 1002 is in the short-circuit state. The above open-circuit state and short-circuit state may indicate that the light-emitting element 1002 is in a failed state. In addition, when the potential of the detection signal Ssen is substantially equal to the value (VDD-Vf) obtained by subtracting the forward bias voltage of the light-emitting diode D1 from the potential of the high voltage source PVDD and, it is determined that the light-emitting element 1002 is in an emitting state, that is, in a normal operation state.

According to another embodiment of the present disclosure, in cases where the driving unit 1001 provides the driving signal in the display mode, when the conductive terminal of the third transistor T3 receives the second control signal CS2 with the high potential to turn on the third transistor T3, the potential of the detection signal Ssen at the detection node Nsen is substantially equal to the first potential of the first node N1. At this time, the magnitude of the potential of the detection signal Ssen can be used as a basis for determining whether at least one of the plurality of display data supplied to the driving circuit 200 needs to be compensated according to a potential of the detection signal Ssen.

As described above, the driving circuits and the display panels of a tiled electronic device provided by the embodiments of the present disclosure can determine various connection states of the light-emitting diodes by detecting the potentials of the nodes in the driving circuits. In addition to determining that each of the light-emitting diodes is in a normal operation state or a failed state, it can be further determined that the failed light-emitting diode is in an open-circuit state or a short-circuit state. Further, the position of the failed light-emitting diode in the active area can be determined by the readout circuit. In particular, the driving circuits provided by the embodiments of the present disclosure can be applied to a micro LED display panel or a mini LED display panel.

In the above embodiments, the display panel enters at least one of the first test period and the second test period in the test mode. In an embodiment, if both the first test period and the second test period are available to one display panel, the display panel first enters the first test period to determine whether the detection unit is in a failed state. When it is determined that the detection unit is not in a failed state (i.e., it operates normally), the display panel enters the second test period to determine whether the light-emitting element is in a failed state.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving circuit for driving a light-emitting element, comprising:

a driving unit having a first terminal coupled to a first voltage source, a second terminal coupled to a data line to receive a plurality of display data, and a third terminal coupled to a first node, wherein the driving unit provides a driving signal to the first node according to the plurality of display data and comprises:

a first transistor having a first terminal coupled to the data line to receive the plurality of display data, a second terminal coupled to a second node, and a conductive terminal receiving a first control signal;

a capacitor having a first terminal coupled to the second node and a second terminal coupled to the first voltage source; and a second transistor having a first terminal coupled to the first voltage source, a second terminal coupled to the first node, and a conductive terminal coupled to the second node;

the light-emitting element having a first terminal coupled to the first node and a second terminal coupled to a second voltage source;

a detection unit coupled to the first node and a detection node, wherein the detection unit comprises a third transistor having a conductive terminal receiving a second control signal, a first terminal coupled to the second terminal of the second transistor, and a second terminal coupled to the detection node; and a fourth transistor having a conductive terminal receiving a third control signal, a first terminal coupled to the second terminal of the second transistor, and a second terminal coupled to the first terminal of the light-emitting element;

wherein in a test mode, when the driving unit provides the driving signal, the detection unit detects a potential of the first node to generate a detection signal which is used to indicate a state of the light-emitting element or the detection unit, and wherein during a first test period in the test mode, in response to the second transistor being turned on, the detection signal whose potential is substantially equal to a potential of the first voltage source indicates that the light-emitting element is in an open-circuit state.

2. The driving circuit as claimed in claim 1, wherein during the first test period in the test mode, the detection signal whose potential is substantially equal to a potential of the second voltage source indicates that the light-emitting element is in a short-circuit state.

3. The driving circuit as claimed in claim 1, wherein the light-emitting element is implemented by a light-emitting diode, and in the test mode, the detection signal indicates that the light-emitting element is in an emitting state in response to the sum of a potential of the second voltage source and a forward bias voltage of the light-emitting diode.

4. The driving circuit as claimed in claim 1, wherein during a first test period in the test mode, the first transistor is turned on according to the first control signal, and the capacitor is charged by a voltage of at least one of the plurality of display data, and wherein during the first test period in the test mode, when the first transistor is turned off according to the first control signal, the second transistor is turned on by a voltage supplied by the capacitor to provide the driving signal to the first node.

5. The driving circuit as claimed in claim 1, wherein a plurality of enable pulses of the first control signal and a plurality of enable pulses of the second control signal are separated in timing.

6. The driving circuit as claimed in claim 1, wherein the first terminal and second terminal of the fourth transistor are respectively coupled to the second terminal of the second transistor and the first node.

7. The driving circuit as claimed in claim 6, further comprising:

a fifth transistor having a conductive terminal, a first terminal, and a second terminal, wherein the conductive terminal of the fifth transistor receives the third control signal, and wherein the first terminal and second terminal of the fifth transistor are respectively coupled to the first node and the first terminal of the light-emitting element, or the second terminal of the light-emitting element and the second voltage source.

8. The driving circuit as claimed in claim 1, wherein during a second test period in the test mode, when the driving unit provides the driving signal, the detection signal whose potential is substantially equal to the potential of the first node indicates that the detection unit is in a normal operation state.

9. The driving circuit as claimed in claim 1, wherein in a display mode, when the driving unit provides the driving signal, the detection signal generated at the detection node indicates whether at least one of the plurality of display data needs to be compensated according to a potential of the detection signal.

10. A tiled electronic device comprising:

a plurality of display panels, wherein at least one of the plurality of display panels comprises:

a plurality of data lines;

a plurality of driving circuits electrically connected to the data lines, wherein each driving circuit is configured to drive a light-emitting element and comprises:

a driving unit having a first terminal coupled to a first voltage source, a second terminal coupled to one of the data lines to receive a plurality of display data, and a third terminal coupled to a first node, wherein the driving unit provides a driving signal to the first node according to the plurality of display data and comprises a first transistor having a first terminal coupled to the corresponding data line to receive the plurality of display data, a second terminal coupled to a second node, and a conductive terminal receiving a first control signal;

a capacitor having a first terminal coupled to the second node and a second terminal coupled to the first voltage source; and a second transistor having a first terminal coupled to the first voltage source, a second terminal coupled to the first node, and a conductive terminal coupled to the second node;

the light-emitting element having a first terminal coupled to the first node and a second terminal coupled to a second voltage source;

a detection unit coupled to the first node and a detection node, wherein the detection unit comprises a third transistor having a conductive terminal receiving a second control signal, a first terminal coupled to the second terminal of the second transistor, and a second terminal coupled to the detection node; and a fourth transistor having a conductive terminal receiving a third control signal, a first terminal coupled to the second terminal of the second transistor, and a second terminal coupled to the first terminal of the light-emitting element;

wherein in a test mode, when the driving unit provides the driving signal, the detection unit generates a detection signal to indicate a state of the light-emitting element or the detection unit; and a readout circuit comprising a multiplexer, wherein the multiplexer comprises a plurality of input terminals and an output terminal, and wherein the input terminals of the multiplexer are coupled to the detection nodes of the driving circuits to receive the detection signals sequentially and outputs the detection signals to the output terminal of the multiplexer, and wherein in the test mode, in response to the second transistor being turned on, the detection signal whose potential is substantially equal to a potential of the first voltage source indicates that the light-emitting element is in an open-circuit state.

11. The tiled electronic device as claimed in claim 10, wherein in the test mode, the first transistor is turned on according to the first control signal, and the capacitor is charged by a voltage of at least one of the plurality of display data, and wherein in the test mode, when the first transistor is turned off according to the first control signal, the second transistor is turned on by a voltage supplied by the capacitor to provide the driving signal to the first node.

12. The tiled electronic device as claimed in claim 10, further comprising a plurality of detection lines, wherein the input terminals of the multiplexer are connected to the respective detection lines and further coupled to the detection nodes of the driving circuits through the detection lines.

13. The tiled electronic device as claimed in claim 10, wherein the input terminals of the multiplexer are connected to the respective data lines and further coupled to the detection nodes of the driving circuits through the data lines.

14. A test method for a display panel, the display panel comprising a driving unit configured to drive a light-emitting element and a detection unit, the light-emitting element being coupled to the driving unit at a first node, and the detection unit being coupled to the first node and a detection node, the driving unit comprising a first transistor coupled between a data line and a second node, a capacitor coupled between the second node and a first voltage source, and a second transistor coupled between the first voltage source and the first node, the detection unit comprising a third transistor having a conductive terminal receiving a second control signal, a first terminal coupled to the second terminal of the second transistor, and a second terminal coupled to the detection node, and the display panel further comprising a fourth transistor having a conductive terminal receiving a third control signal, a first terminal coupled to the second terminal of the second transistor, and a second terminal coupled to the first terminal of the light-emitting element, the test method comprising:

providing a plurality of display data;

according to the plurality of display data, providing a driving signal to the light-emitting element from the second transistor through the fourth the transistor;

during the first test period, in response to the second transistor being turned on, detecting a potential of the first node through the third transistor to generate a detection signal; and determining whether the light-emitting element is in an open-circuit state according to a potential of the detection signal.

15. The test method as claimed in claim 14, further comprising:

during a second test period, in response to an enable pulse, determining whether one of the driving unit and the detection unit is in a failed state according to the potential of the detection signal; and during the first test period following the second test period, determining whether the light-emitting element is in the open-circuit state according to the potential of the detection signal.

16. The test method as claimed in claim 14, further comprising:

during the first test period, turning on a first transistor, wherein the capacitor is charged by a voltage of at least one of the plurality of display data, wherein during the first test period, when the first transistor is turned off according to a first control signal, the second transistor is turned on by a voltage supplied by the capacitor to provide the driving signal to the first node, and wherein during the first test period, in response to the second transistor being turned on and the first transistor being turned off, the potential of the first node is detected to generate the detection signal.

* * * * *